(12) United States Patent
Kroop et al.

(10) Patent No.: US 10,983,520 B2
(45) Date of Patent: *Apr. 20, 2021

(54) TELEASSISTANCE DATA PRIORITIZATION FOR SELF-DRIVING VEHICLES

(71) Applicant: UATC, LLC, San Francisco, CA (US)

(72) Inventors: Benjamin Kroop, Pittsburgh, PA (US); William Ross, Pittsburgh, PA (US); Andrew Heine, Pittsburgh, PA (US)

(73) Assignee: Uber Technologies, Inc., San Francisco, CA (US)

( * ) Notice: Subject to any disclaimer, the term of this patent is extended or adjusted under 35 U.S.C. 154(b) by 149 days.

This patent is subject to a terminal disclaimer.

(21) Appl. No.: 16/271,558

(22) Filed: Feb. 8, 2019

(65) Prior Publication Data

US 2019/0168748 A1 Jun. 6, 2019

Related U.S. Application Data

(63) Continuation of application No. 15/452,431, filed on Mar. 7, 2017, now Pat. No. 10,293,818.

(51) Int. Cl.
*G05D 1/00* (2006.01)
*B60W 60/00* (2020.01)
(Continued)

(52) U.S. Cl.
CPC ........... *G05D 1/0088* (2013.01); *B60W 10/04* (2013.01); *B60W 10/18* (2013.01); *B60W 10/20* (2013.01);
(Continued)

(58) Field of Classification Search
CPC .. G05D 1/0011; G05D 1/0022; G05D 1/0038; G05D 1/0044; G05D 1/005;
(Continued)

(56) References Cited

U.S. PATENT DOCUMENTS

| 4,405,943 A | 9/1983 | Kanaly |
| 6,339,745 B1 | 1/2002 | Novik |

(Continued)

FOREIGN PATENT DOCUMENTS

| DE | 10118188 | 10/2002 |
| EP | 2709207 | 3/2014 |

(Continued)

OTHER PUBLICATIONS

Fong, Terrence et al., "Vehicle teleoperation interfaces", Autonomous Roots 11, pp. 9-18, 2001.

(Continued)

*Primary Examiner* — Faris S Almatrahi
*Assistant Examiner* — David A Testardi
(74) *Attorney, Agent, or Firm* — Mahamedi IP Law LLP

(57) ABSTRACT

A system can analyze a live sensor view of a self-driving vehicle (SDV) in accordance with a safety threshold to detect objects of interest along a route and classify each detected object of interest. When the safety threshold is not met, the system can transmit a teleassistance inquiry using LIDAR data to a backend computing system. When a certainty threshold is not met for an object of interest, the system can transmit a different teleassistance inquiry using image data to the backend computing system.

19 Claims, 9 Drawing Sheets

(51) Int. Cl.
| | | |
|---|---|---|
| *B60W 30/09* | (2012.01) | |
| *G05D 1/02* | (2020.01) | |
| *B60W 10/04* | (2006.01) | |
| *B60W 10/18* | (2012.01) | |
| *B60W 10/20* | (2006.01) | |
| *G07C 5/00* | (2006.01) | |
| *H04W 84/12* | (2009.01) | |
| *H04W 84/04* | (2009.01) | |

(52) U.S. Cl.
CPC ........ *B60W 30/09* (2013.01); *B60W 60/0015* (2020.02); *G05D 1/0022* (2013.01); *G05D 1/0038* (2013.01); *G05D 1/0061* (2013.01); *G05D 1/0231* (2013.01); *G05D 1/0246* (2013.01); *G07C 5/008* (2013.01); *B60W 2554/00* (2020.02); *B60W 2710/18* (2013.01); *B60W 2710/20* (2013.01); *B60W 2720/106* (2013.01); *G05D 2201/0213* (2013.01); *H04W 84/04* (2013.01); *H04W 84/12* (2013.01)

(58) Field of Classification Search
CPC .. G05D 1/0055; G05D 1/0088; G05D 1/0214; G05D 1/0246; G05D 1/0248; G05D 1/0285; G05D 1/0297; B60W 30/09; B60W 50/029; B60W 60/001; B60W 60/0015; B60W 60/0025; B60W 60/005; B60W 60/007; H04L 67/025; H04L 67/12; G07C 5/008
See application file for complete search history.

(56) References Cited

U.S. PATENT DOCUMENTS

| | | | |
|---|---|---|---|
| 6,405,132 | B1 | 6/2002 | Breed |
| 6,424,638 | B1 | 7/2002 | Ray |
| 7,095,318 | B1 | 8/2006 | Bekhor |
| 7,359,004 | B2 | 4/2008 | Yu |
| 7,889,065 | B2 | 2/2011 | Smith |
| 7,904,092 | B2 | 3/2011 | Hart |
| 8,155,081 | B1 | 4/2012 | Mater |
| 8,370,392 | B1 | 2/2013 | Hunt |
| 8,417,239 | B1 | 4/2013 | DeCusatis |
| 8,437,890 | B2 | 5/2013 | Anderson |
| 8,452,310 | B1 | 5/2013 | Orlik |
| 8,601,595 | B2 | 12/2013 | Gelvin |
| 8,676,431 | B1 | 3/2014 | Mariet |
| 8,818,719 | B1 | 8/2014 | Thanayankizil |
| 8,880,273 | B1 | 11/2014 | Chatham |
| 8,954,252 | B1 | 2/2015 | Urmson |
| 9,014,905 | B1 | 4/2015 | Whitehill |
| 9,025,463 | B1 | 5/2015 | Mankee |
| 9,057,620 | B2 | 6/2015 | Dave |
| 9,087,348 | B2 | 7/2015 | Petrucci |
| 9,107,132 | B2 | 8/2015 | Kowshik |
| 9,384,402 | B1 | 7/2016 | Furman |
| 9,432,929 | B1 | 8/2016 | Ross |
| 9,441,975 | B2 | 9/2016 | Pylappan |
| 9,465,338 | B2 | 10/2016 | Fairfield |
| 9,465,388 | B1 * | 10/2016 | Fairfield ............. G05D 1/0044 |
| 9,467,832 | B2 | 10/2016 | Haney |
| 9,475,422 | B2 | 10/2016 | Hillis |
| 9,481,367 | B1 | 11/2016 | Gordon |
| 9,483,948 | B1 | 11/2016 | Gordon |
| 9,488,490 | B2 | 11/2016 | Chintakindi |
| 9,507,346 | B1 | 11/2016 | Levinson |
| 9,537,561 | B1 | 1/2017 | Kotecha |
| 9,557,183 | B1 | 1/2017 | Ross |
| 9,565,625 | B1 | 2/2017 | MacNeille |
| 9,603,158 | B1 | 3/2017 | Ross |
| 9,612,123 | B1 | 4/2017 | Levinson |
| 10,182,438 | B2 | 1/2019 | Dayanandan |
| 10,293,818 | B2 * | 5/2019 | Kroop ................. G05D 1/0022 |
| 2001/0038610 | A1 | 11/2001 | Decker |
| 2002/0029108 | A1 | 3/2002 | Liu |
| 2003/0073442 | A1 | 4/2003 | Fattouch |
| 2004/0029558 | A1 | 2/2004 | Liu |
| 2004/0157549 | A1 | 8/2004 | Dold |
| 2004/0212540 | A1 | 10/2004 | Kennedy |
| 2005/0090226 | A1 | 4/2005 | Wolf |
| 2005/0163460 | A1 | 7/2005 | Merkel |
| 2005/0168353 | A1 | 8/2005 | Dement |
| 2005/0171654 | A1 | 8/2005 | Nichols |
| 2006/0059024 | A1 | 3/2006 | Bailey |
| 2006/0189533 | A1 | 8/2006 | Fujishima |
| 2006/0229070 | A1 | 10/2006 | de La Chapelle |
| 2006/0229103 | A1 | 10/2006 | Monk |
| 2006/0229104 | A1 | 10/2006 | de La Chapelle |
| 2006/0235615 | A1 | 10/2006 | Kato |
| 2007/0077945 | A1 | 4/2007 | Sheynblat |
| 2007/0178911 | A1 | 8/2007 | Baumeister |
| 2007/0185646 | A1 | 8/2007 | Neugebauer |
| 2008/0097688 | A1 | 4/2008 | Tashev |
| 2008/0108355 | A1 | 5/2008 | Oleszcsuk |
| 2008/0186882 | A1 | 8/2008 | Scherzer |
| 2008/0242305 | A1 | 10/2008 | Kahlert |
| 2009/0005097 | A1 | 1/2009 | Shaffer |
| 2009/0109061 | A1 | 4/2009 | McNew et al. |
| 2009/0196234 | A1 | 8/2009 | Greene |
| 2009/0196258 | A1 | 8/2009 | Escobar Sanz |
| 2009/0254254 | A1 | 10/2009 | Wang |
| 2009/0286526 | A1 | 11/2009 | Matsunaga |
| 2010/0082193 | A1 | 4/2010 | Chiappetta |
| 2010/0120466 | A1 | 5/2010 | Li |
| 2010/0151865 | A1 | 6/2010 | Camp, Jr. |
| 2010/0290359 | A1 | 11/2010 | Dewey |
| 2011/0128161 | A1 | 6/2011 | Bae |
| 2011/0130894 | A1 * | 6/2011 | Kim .................... G05D 1/0282 701/2 |
| 2011/0171960 | A1 | 7/2011 | Hershey |
| 2011/0208417 | A1 | 8/2011 | Fink |
| 2011/0227757 | A1 | 9/2011 | Chen |
| 2013/0006674 | A1 | 1/2013 | Bowne |
| 2013/0064134 | A1 | 3/2013 | Xiong |
| 2013/0073327 | A1 | 3/2013 | Edelberg |
| 2013/0115956 | A1 | 5/2013 | Ewert |
| 2013/0122934 | A1 | 5/2013 | Branch |
| 2013/0142035 | A1 | 6/2013 | Sunderrajan |
| 2013/0182575 | A1 | 7/2013 | McLean |
| 2013/0184985 | A1 | 7/2013 | Bollars |
| 2013/0218469 | A1 | 8/2013 | Turton |
| 2013/0225229 | A1 | 8/2013 | Al-Shalash |
| 2013/0279349 | A1 | 10/2013 | Pandey |
| 2013/0322388 | A1 | 12/2013 | Ahn |
| 2014/0087739 | A1 | 3/2014 | Weaver |
| 2014/0180501 | A1 | 6/2014 | Kyllmann |
| 2014/0188377 | A1 | 7/2014 | Bonawitz |
| 2014/0278035 | A1 | 9/2014 | Nortrup |
| 2014/0297116 | A1 | 10/2014 | Anderson |
| 2014/0306833 | A1 | 10/2014 | Ricci |
| 2014/0309789 | A1 | 10/2014 | Ricci |
| 2014/0309814 | A1 | 10/2014 | Ricci |
| 2014/0309864 | A1 | 10/2014 | Ricci |
| 2014/0355476 | A1 | 12/2014 | Anderson |
| 2015/0023256 | A1 | 1/2015 | Liu |
| 2015/0063144 | A1 | 3/2015 | Kozat |
| 2015/0081212 | A1 | 3/2015 | Mitchell |
| 2015/0097864 | A1 | 4/2015 | Alaniz |
| 2015/0133167 | A1 | 5/2015 | Edge |
| 2015/0149078 | A1 | 5/2015 | Profous |
| 2015/0175161 | A1 | 6/2015 | Breed |
| 2015/0178953 | A1 | 6/2015 | Gao |
| 2015/0181414 | A1 | 6/2015 | Bretscher |
| 2015/0215738 | A1 | 7/2015 | Frusina |
| 2015/0222372 | A1 | 8/2015 | Le Grand |
| 2015/0244826 | A1 * | 8/2015 | Stenneth ............. H04L 67/322 709/213 |
| 2015/0248131 | A1 | 9/2015 | Fairfield |
| 2015/0264519 | A1 | 9/2015 | Mirzaei |
| 2015/0281906 | A1 | 10/2015 | Tseng |
| 2015/0308841 | A1 | 10/2015 | Matsunaga |
| 2015/0331111 | A1 | 11/2015 | Newman |
| 2015/0334750 | A1 | 11/2015 | Mehta |

(56) References Cited

U.S. PATENT DOCUMENTS

| | | | |
|---|---|---|---|
| 2015/0339928 A1 | 11/2015 | Ramanujam | |
| 2015/0346718 A1* | 12/2015 | Stenneth | G06Q 30/0611 |
| | | | 701/2 |
| 2016/0006723 A1 | 1/2016 | Wilson | |
| 2016/0031441 A1 | 2/2016 | Foley | |
| 2016/0073117 A1 | 3/2016 | Grasmug | |
| 2016/0105233 A1 | 4/2016 | Jalali | |
| 2016/0139594 A1* | 5/2016 | Okumura | B60W 30/00 |
| | | | 701/2 |
| 2016/0157254 A1 | 6/2016 | Novlan | |
| 2016/0191861 A1* | 6/2016 | Tinskey | H04L 65/4092 |
| | | | 348/148 |
| 2016/0260328 A1 | 9/2016 | Mishra | |
| 2016/0282468 A1 | 9/2016 | Gruver | |
| 2016/0301698 A1 | 10/2016 | Katara | |
| 2016/0323356 A1 | 11/2016 | Ribeiro | |
| 2016/0334229 A1* | 11/2016 | Ross | B60W 50/029 |
| 2016/0334230 A1* | 11/2016 | Ross | G01C 21/3415 |
| 2016/0337935 A1 | 11/2016 | Patil | |
| 2016/0358475 A1 | 12/2016 | Prokhorov | |
| 2016/0370801 A1* | 12/2016 | Fairfield | G05D 1/0038 |
| 2017/0057475 A1 | 3/2017 | Lim | |
| 2017/0120804 A1 | 5/2017 | Kentley | |
| 2017/0132334 A1 | 5/2017 | Levinson | |
| 2017/0192423 A1* | 7/2017 | Rust | G01C 21/3492 |
| 2017/0223712 A1 | 8/2017 | Stephens | |
| 2017/0268888 A1 | 9/2017 | Blumenberg | |
| 2017/0277186 A1 | 9/2017 | Ross | |
| 2017/0366935 A1* | 12/2017 | Ahmadzadeh | G08G 1/096883 |
| 2017/0371338 A1 | 12/2017 | Kamata | |
| 2018/0046182 A1* | 2/2018 | Joyce | B60W 50/0225 |
| 2018/0059683 A1 | 3/2018 | Cefkin | |
| 2018/0181118 A1 | 6/2018 | Yoneda | |
| 2018/0224850 A1* | 8/2018 | Kroop | G08G 1/00 |
| 2018/0257643 A1 | 9/2018 | Kroop | |
| 2018/0257661 A1 | 9/2018 | Kroop | |
| 2018/0281815 A1 | 10/2018 | Stentz | |
| 2019/0138008 A1 | 5/2019 | Ross | |
| 2019/0143967 A1* | 5/2019 | Kutila | G05D 1/0257 |
| | | | 701/23 |
| 2019/0167848 A1 | 6/2019 | Kroop | |
| 2019/0278298 A1* | 9/2019 | Pedersen | G05D 1/0027 |
| 2019/0317491 A1* | 10/2019 | Kobayashi | G05D 1/0038 |
| 2020/0068434 A1* | 2/2020 | Pedersen | H04W 4/029 |

FOREIGN PATENT DOCUMENTS

| | | |
|---|---|---|
| GB | 2511860 | 9/2014 |
| WO | WO 2011/069170 | 6/2011 |

OTHER PUBLICATIONS

Reuschenbach, Arturo et al., "iDriver—human machine interface for autonomous cars", 2011 Eighth International Coference on Information Technology: New Generations, Las Vegas, NV 2011, pp. 435-440.

Office Action dated Apr. 17, 2020 in EP 16873859.9.

Jennifer J.N.Liu, et al., "Mobile Ad Hoc Networking with a View of 4G Wireless: Imperatives and Challenges", In: Mobie Ad Hoc Networking, 2004 Institute of Electrical and Electronics Engineers, Inc. Jan. 28, 2005, Section 1.2.

ISR and WO issued in PCT/US2016/065656 dated Apr. 11, 2017.

ISR and WO issued in PCT/US2016/068563 dated Apr. 17, 2017.

IPRP dated Sep. 7, 2018 in PCT/US2016/068563.

SESR dated Dec. 4, 2018 in EP 16873859.9.

EESR dated Mar. 8, 2019 in EP 16873859.9.

\* cited by examiner

TELEASSISTANCE DATA PRIORITIZATION FOR SELF-DRIVING VEHICLES

CROSS REFERENCE TO RELATED APPLICATION

This application is a continuation of U.S. patent application Ser. No. 15/452,431, titled Teleassistance Data Prioritization for Self-Driving Vehicles, and filed on Mar. 7, 2017; which is hereby incorporated by reference in its entirety.

BACKGROUND

On-board features of modern vehicles can have the effect of distracting the driver from safe operation of the vehicle. Such on-board features can include BLUETOOTH telephony, radio, CD, or MP3 audio players, on-board DVD or MP4 video players, mapping and routing features, and on-board voice text messaging or SMS features that enable drivers to read and response to text messages while, at the same time, attempting to safely operate the vehicle in traffic. Such on-board features may further include on-demand television, social media and other content browsing features, calendar scheduling, and voice and video conferencing. As network technology progresses, modern vehicles will continue to evolve into "smart" vehicles capable of providing the user with evolutions of the above-mentioned on-board features that contribute to visual, manual, and cognitive distraction.

At the same time, vehicle manufacturers continue to provide evolving safety features that include not only structural and mechanical characteristics (e.g., crumple structures, carbon fiber materials, etc.), but also software-based driving aids that support the driver, for example, in lane-keeping, following, preemptive braking, and collision detection and avoidance.

Autonomous vehicle technology seeks to circumvent manufacturer conflict between providing desirable on-board features and maintaining driver awareness for safe driving. Nevertheless, the human brain has significant advantages over current autonomous driving systems, being capable of rapid and intelligent perception, thought, and decision-making. In order to progress from current autonomous capabilities to full autonomy and acceptable trustworthiness in all road conditions and environments, leveraging human cognition may be advantageous in assisting and intervening autonomous vehicle operations in various scenarios.

BRIEF DESCRIPTION OF THE DRAWINGS

The disclosure herein is illustrated by way of example, and not by way of limitation, in the figures of the accompanying drawings in which like reference numerals refer to similar elements, and in which.

DETAILED DESCRIPTION

Figure 1:
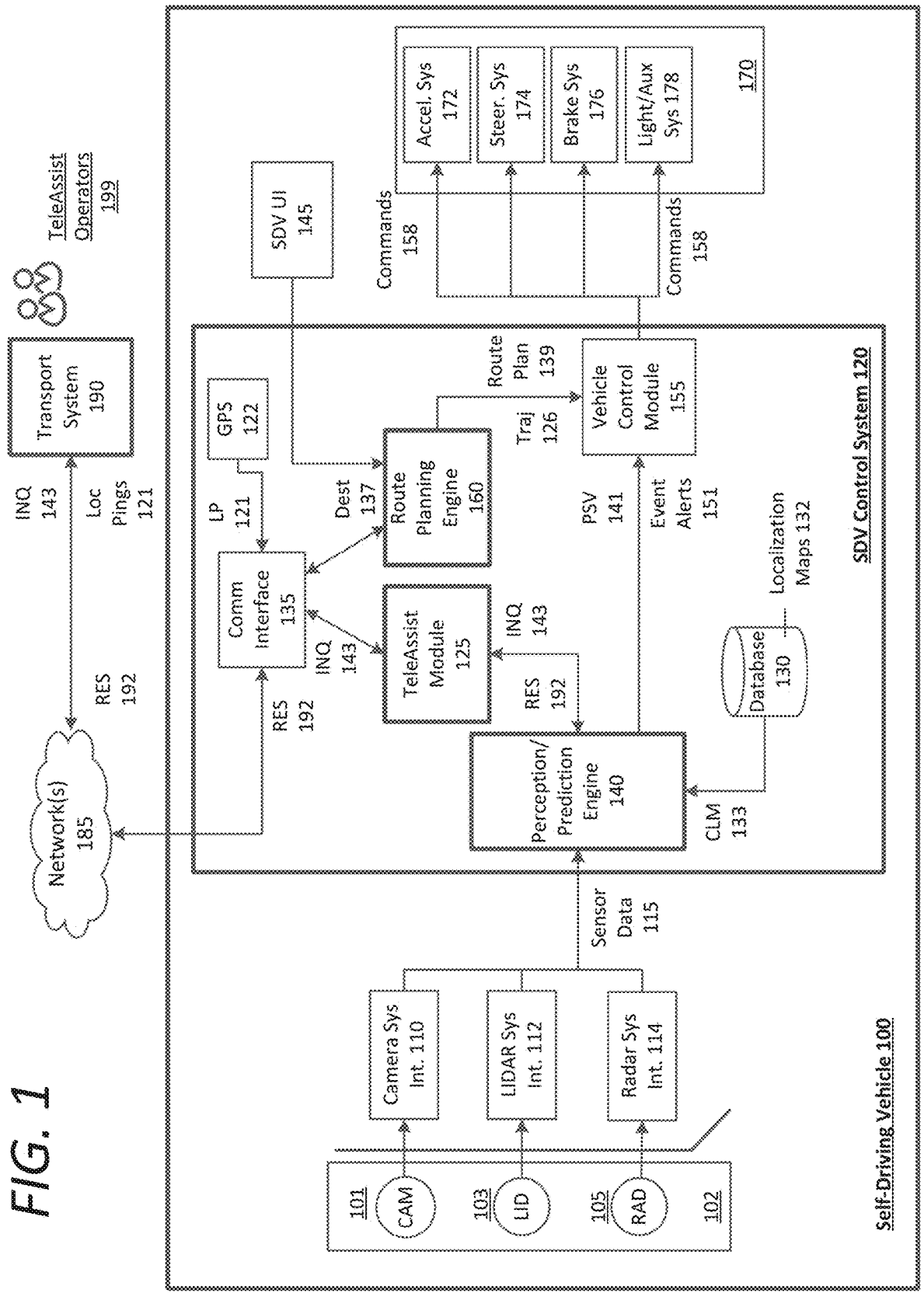
FIG. 1 is a block diagram illustrating an example self-driving vehicle operated by a control system implementing a teleassistance module, as described herein.

A self-driving vehicle (SDV) can include a sensor suite to generate a live sensor view of a surrounding area of the SDV and acceleration, braking, and steering systems autonomously operated by a control system. In various implementations, the control system can dynamically analyze the sensor view of the surrounding area and a road network map (e.g., a highly detailed localization map) in order to autonomously operate the acceleration, braking, and steering systems along a current route to a destination.

In certain examples, the SDV can include a communication interface to enable the control system to communicate to a backend transport system. In one aspect, the backend transport system can be implemented through one or more datacenters and can manage on-demand transportation services for a fleet of SDVs operating throughout a given region (e.g., a metroplex such as the San Francisco Bay metropolitan area). In some examples, as the SDV operates throughout the given region, the SDV can transmit and receive communications for the backend transport system. These communications can comprise transport instructions to rendezvous with a requesting user at a pick-up location, location data indicating such pick-up locations and destinations, routing data indicating an optimal route to the pick-up location and then onwards to the destination, and routing updates indicating dynamic changes to traffic conditions along a particular route.

In various implementations, the SDV can also communicate teleassistance data to the backend transport system, or a remote teleassistance system. For example, the control system of the SDV can include perception and prediction engines that can make decisions with regard to acceleration, braking, and steering inputs in accordance with confidence metrics in both detecting respective fields of view and classifying detected objects in those fields of view. Based on a detected anomaly in the live sensor view, the control system can transmit a teleassistance inquiry to the transport system, which can be processed by human teleassistance operators. In certain aspects, the control system can transmit sensor data in conjunction with the teleassistance inquiry in accordance with a data prioritization scheme. Additionally or alternatively, the control system can parse, encode, and/or compress the sensor data prior to transmitting or streaming the data to teleassistance operators. In further examples, the control system can specify an anomalous object with a bounding box, which may be encoded at a higher quality than a remainder of the sensor data.

In order to ensure that the teleassistance data is properly transmitted, the control system can transmit data in accordance with a prioritization scheme. For example, the SDV may comprise multiple communication modules communicating with the transport system using any number of communications standards and/or protocols. Some communication modules may be more reliable than others in general, or depending on the location of the SDV in the given region. At a high level, the prioritization scheme can cause the control system to prioritize teleassistance communications over other communications (e.g., as a highest priority data transmission), and at a lower level, can prioritize certain types of sensor data depending on the type and nature of the anomaly. Specifically, the SDV can communicate location pings and other periodic data to the backend transport system, where some transmissions may require retransmission or may be lost outright. The control system can monitor the bandwidth and performance of the SDV's communication modules to ensure that any teleassistance communications be transmitted over the most reliable and/or highest bandwidth communication module(s). Furthermore, the control system can categorize the teleassistance inquiry as, for example, a detection issue or an object classification issue. In one aspect, for detection issues (e.g., an obstruction in the sensor view) the control system can prioritize LIDAR data for transmission with the teleassistance inquiry, and for classification issues (e.g., an indeterminate object) the control system can prioritize image or video data.

In still further implementations, the control system may have difficulty either resolving objects in the live sensor view, or operating the control mechanisms of the SDV (e.g., the acceleration, braking, and/or steering systems). Such difficulties may arise from fault or failed conditions in the sensors, the computer stack of the vehicle, or from a mechanical system of the vehicle itself (e.g., a tire with low air pressure affecting steering). In these implementations, the control system can transmit diagnostics data to enable the teleassistance operator to provide a resolution.

In many aspects, the teleassistance inquiry can seek assistance from backend operators in resolving detection difficulties, such as when a critical occlusion exists in the live sensor view, or when an object of interest is not readily classifiable by the control system. It is contemplated that on-board computational capabilities of self-driving vehicles may be inferior to the computing power of backend datacenters. Accordingly, the backend teleassistance operators may be human or may be teleassistance computers or virtual machines executing instruction sets for detecting and classifying objects in road environments, or can run deep learning models specific to those tasks. According to examples provided herein, the control system can receive a resolution response from the backend teleassistance operator based on the teleassistance inquiry. The resolution response can comprise data classifying the unresolved object of interest, or can include an instruction of how to proceed when a detection anomaly exists. The control system may then proceed along the current route (or an alternate route) in accordance with the resolution response.

In certain aspects, the teleassistance operator may require additional data to resolve a detected anomaly. For example, localization information corresponding to the location and orientation of the SDV in the given region may provide context to the teleassistance operator given a current overall traffic situation local to the SDV. In some scenarios, diagnostics information of the SDV and/or the SDV's sensor systems can provide context to the teleassistance operator when, for example, a malfunction or fault has occurred with an SDV system (e.g., a failed tire, a fault condition on a sensor, debris occluding the sensor view, etc.). Providing this additional data can aid the teleassistance operator in assisting the SDV and constructing or otherwise generating the resolution package to enable the SDV to proceed.

Among other benefits, the examples described herein achieve a technical effect of providing dynamic resolution of anomalies for a self-driving vehicle (SDV) when operating on public roads and highways. Current technologies typically involve the SDV pulling over or stopping when anomalous conditions exist, or an on-board human engineer being provided with alerts and resolving them on-the-fly, or even an alert human backup driver sitting in the driver's seat of the SDV, ready to take over manual control of the SDV during emergency events. Prioritization of teleassistance data and specialized encoding and/or duplication of teleassistance inquiries and streamed sensor data can provide for improved resolution of detected anomalies with reduced impact on bandwidth usage.

As used herein, a computing device refers to devices corresponding to desktop computers, cellular devices or smartphones, personal digital assistants (PDAs), laptop computers, tablet devices, virtual reality (VR) and/or augmented reality (AR) devices, wearable computing devices, television (IP Television), etc., that can provide network connectivity and processing resources for communicating with the system over a network. A computing device can also correspond to custom hardware, in-vehicle devices, or on-board computers, etc. The computing device can also operate a designated application configured to communicate with the network service.

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein may be implemented, in whole or in part, on computing devices such as servers, desktop computers, cellular or smartphones, personal digital assistants (e.g., PDAs), laptop computers, virtual reality (VR) or augmented reality (AR) computers, network equipment (e.g., routers) and tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples disclosed herein can be carried and/or executed. In particular, the numerous machines shown with examples of the invention include processors and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as those carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

As provided herein, the terms "autonomous vehicle" (AV) or "self-driving vehicle" (SDV) may be used interchangeably to describe any vehicle operating in a state of autonomous control with respect to acceleration, steering, and braking. Different levels of autonomy may exist with respect to AVs and SDVs. For example, some vehicles may enable autonomous control in limited scenarios, such as on highways. More advanced AVs and SDVs can operate in a variety of traffic environments without any human assistance. Accordingly, an "AV control system" can process sensor data from the AV or SDV's sensor array, and modulate acceleration, steering, and braking inputs to safely drive the AV or SDV along a given route.

System Description

FIG. 1 is a block diagram illustrating an example self-driving vehicle operated by a control system implementing a teleassistance module, as described herein. In an example of FIG. 1, a control system 120 can autonomously operate the SDV 100 in a given geographic region for a variety of purposes, including transport services (e.g., transport of humans, delivery services, etc.). In examples described, the SDV 100 can operate without human control. For example, the SDV 100 can autonomously steer, accelerate, shift, brake, and operate lighting components. Some variations also recognize that the SDV 100 can switch between an autonomous mode, in which the SDV control system 120 autonomously operates the SDV 100, and a manual mode in which a driver takes over manual control of the acceleration system 172, steering system 174, braking system 176, and lighting and auxiliary systems 178 (e.g., directional signals and headlights).

According to some examples, the control system 120 can utilize specific sensor resources in order to autonomously operate the SDV 100 in a variety of driving environments and conditions. For example, the control system 120 can operate the SDV 100 by autonomously operating the steering, acceleration, and braking systems 172, 174, 176 of the SDV 100 to a specified destination 137. The control system 120 can perform vehicle control actions (e.g., braking, steering, accelerating) and route planning using sensor information, as well as other inputs (e.g., transmissions from remote or local human operators, network communication from other vehicles, etc.).

In an example of FIG. 1, the control system 120 includes computational resources (e.g., processing cores and/or field programmable gate arrays (FPGAs)) which operate to process sensor data 115 received from a sensor system 102 of the SDV 100 that provides a sensor view of a road segment upon which the SDV 100 operates. The sensor data 115 can be used to determine actions which are to be performed by the SDV 100 in order for the SDV 100 to continue on a route to the destination 137. In some variations, the control system 120 can include other functionality, such as wireless communication capabilities using a communication interface 135, to send and/or receive wireless communications over one or more networks 185 with one or more remote sources. In controlling the SDV 100, the control system 120 can generate commands 158 to control the various control mechanisms 170 of the SDV 100, including the vehicle's acceleration system 172, steering system 157, braking system 176, and auxiliary systems 178 (e.g., lights and directional signals).

The SDV 100 can be equipped with multiple types of sensors 102 which can combine to provide a computerized perception of the space and the physical environment surrounding the SDV 100. Likewise, the control system 120 can operate within the SDV 100 to receive sensor data 115 from the collection of sensors 102 and to control the various control mechanisms 170 in order to autonomously operate the SDV 100. For example, the control system 120 can analyze the sensor data 115 to generate low level commands 158 executable by the acceleration system 172, steering system 157, and braking system 176 of the SDV 100. Execution of the commands 158 by the control mechanisms 170 can result in throttle inputs, braking inputs, and steering inputs that collectively cause the SDV 100 to operate along sequential road segments to a particular destination 137.

In more detail, the sensors 102 operate to collectively obtain a sensor view for the SDV 100 (e.g., in a forward operational direction, or providing a 360 degree sensor view), and further to obtain situational information proximate to the SDV 100, including any potential hazards or obstacles. By way of example, the sensors 102 can include multiple sets of camera systems 101 (video cameras, stereoscopic cameras or depth perception cameras, long range monocular cameras), LIDAR systems 103, one or more radar systems 105, and various other sensor resources such as sonar, proximity sensors, infrared sensors, and the like. According to examples provided herein, the sensors 102 can be arranged or grouped in a sensor system or array (e.g., in a sensor pod mounted to the roof of the SDV 100) comprising any number of LIDAR, radar, monocular camera, stereoscopic camera, sonar, infrared, or other active or passive sensor systems.

Each of the sensors 102 can communicate with the control system 120 utilizing a corresponding sensor interface 110, 112, 114. Each of the sensor interfaces 110, 112, 114 can include, for example, hardware and/or other logical components which are coupled or otherwise provided with the respective sensor. For example, the sensors 102 can include a video camera and/or stereoscopic camera system 101 which continually generates image data of the physical environment of the SDV 100. The camera system 101 can provide the image data for the control system 120 via a camera system interface 110. Likewise, the LIDAR system 103 can provide LIDAR data to the control system 120 via a LIDAR system interface 112. Furthermore, as provided herein, radar data from the radar system 105 of the SDV 100 can be provided to the control system 120 via a radar system interface 114. In some examples, the sensor interfaces 110, 112, 114 can include dedicated processing resources, such as provided with field programmable gate arrays (FPGAs) which can, for example, receive and/or preprocess raw image data from the camera sensor.

In general, the sensor systems 102 collectively provide sensor data 115 to a perception/prediction engine 140 of the control system 120. The perception/prediction engine 140 can access a database 130 comprising stored localization maps 132 of the given region in which the SDV 100 operates. The localization maps 132 can comprise highly detailed ground truth data of each road segment of the given region. For example, the localization maps 132 can comprise prerecorded data (e.g., sensor data including image data, LIDAR data, and the like) by specialized mapping vehicles or other SDVs with recording sensors and equipment, and can be processed to pinpoint various objects of interest (e.g., traffic signals, road signs, and other static objects). As the SDV 100 travels along a given route, the perception/prediction engine 140 can access a current localization map 133 of a current road segment to compare the details of the current localization map 133 with the sensor data 115 in order to detect and classify any objects of interest, such as moving vehicles, pedestrians, bicyclists, and the like.

In various examples, the perception/prediction engine 140 can dynamically compare the live sensor data 115 from the SDV's sensor systems 102 to the current localization map 133 as the SDV 100 travels through a corresponding road segment. The perception/prediction engine 140 can flag or otherwise identify any objects of interest in the live sensor data 115 that can indicate a potential hazard. In accordance with many examples, the perception/prediction engine 140 can output a processed sensor view 141 indicating such objects of interest to a vehicle control module 155 of the SDV 100. In further examples, the perception/prediction engine 140 can predict a path of each object of interest and determine whether the SDV control system 120 should respond or react accordingly. For example, the perception/prediction engine 140 can dynamically calculate a collision probability for each object of interest, and generate event alerts 151 if the collision probability exceeds a certain threshold. As described herein, such event alerts 151 can be processed by the vehicle control module 155 that generates control commands 158 executable by the various control mechanisms 170 of the SDV 100, such as the SDV's acceleration, steering, and braking systems 172, 174, 176.

On a higher level, the SDV control system 120 can include a route planning engine 160 that provides the vehicle control module 155 with a route plan 139 and a travel trajectory 126 along a current route 139 to a destination 137. The current route 139 may be determined by a backend transport system 190, or may be determined by the SDV 100 via access to a local or external mapping service. In some aspects, the SDV 100 can include a user interface 145, such as a touch-screen panel or speech recognition features, which can enable a passenger to input a destination 137. Additionally or alternatively, the SDV control system 120 can include a communication interface 135 providing the SDV 100 with connectivity to one or more networks 185. In such implementations, the SDV 100 may communicate with a backend transport system 190 that manages routing of any number of SDVs operating throughout a given region to provide transportation services to requesting riders. Thus, the route planning engine 160 may receive the destination 137 from the backend transport system 190 over the network(s) 185 in order to plan a current route 139 for the SDV 100.

In mapping the current route 139, the route planning engine 160 can generally utilize an on-board mapping engine or an external mapping service by transmitting map calls over the network(s) 185 in order to determine a most optimal route plan 139 from a current location of the SDV 100 to the destination 137. This route plan 139 may be determined based on distance, time, traffic conditions, additional pick-ups (e.g., for carpooling services), and the like. For each successive road segment on which the SDV 100 travels, the route planning engine 160 can provide trajectory data 126 to the vehicle control module 155 to enable the vehicle control module 155 to operate the SDV 100 safely to the next road segment or the destination 137. For example, the trajectory data 126 can indicate that the vehicle control module 155 must change lanes or make a turn in order to proceed to the next road segment along the current route plan 139.

According to examples provided herein, the vehicle control module 155 can utilize the trajectory data 126, the processed sensor view 141, and event alerts 151 to autonomously operate the control mechanisms 170 of the SDV 100. As a basic example, to make a simple turn based on the trajectory data 126, the vehicle control module 155 can generate control commands 158 that cause the lights and auxiliary systems 178 of the SDV 100 to activate the appropriate directional signal, the braking system 176 to slow the SDV 100 down for the turn, the steering system 174 to steer the SDV 100 into the turn, and the acceleration system 172 to propel the SDV 100 when exiting the turn. In further examples, event alerts 151 may indicate potential hazards such as a pedestrian crossing the road, a nearby bicyclist, obstacles on the road, a construction area, proximate vehicles, an upcoming traffic signal and signal state, and the like. The vehicle control module 155 can respond to each event alert 151 on a lower level while, on a higher level, operating the SDV 100 along the determined route plan 139 using the processed sensor view 141.

In various examples, the backend transport system 190 can manage high level routing for a fleet of self-driving vehicles operating throughout a given region. For example, the transport system 190 can receive pick-up requests from requesting users or riders seeking on-demand transportation services, such as the various on-demand transportation arrangement services provided by UBER TECHNOLOGIES Inc., of San Francisco, Calif. In such examples, when a requesting user submits a pick-up request to the transport system 190, the transport system 190 can identify a set of proximate vehicles (e.g., SDVs and/or human-driven vehicles) with respect to a pick-up location for the requesting user. In various aspects, the transport system 190 can receive location pings 121 from location-based resources (e.g., GPS units 122) of SDVs and/or driver devices (e.g., smartphones executing a designated driver application) to identify their locations. The transport system 190 may then select a most optimal SDV 100 amongst the proximate set and transmit an instruction to service the pick-up request. In certain examples, once a confirmation is received from the SDV 100, the transport system 190 can transmit a route update indicating the pick-up location, and in some aspects, an optimal route from the current location of the driver or SDV 100 to the pick-up location.

According to examples described herein, the control system 120 can further include a teleassistance module 125 to enable teleassistance operators 199 to aid the SDV 100 in progressing along the route plan 139 when an anomaly is detected. As provided herein, the anomaly can comprise a detection anomaly in which the control system 120 has difficulty detecting objects (e.g., due to an occlusion), an identification or classification anomaly in which the perception/prediction engine 140 has difficulty classifying detected objects, or a fault anomaly corresponding to a diagnostics fault or failure of a component of the SDV 100, such as a computer, a mechanical component, or a sensor.

In various implementations, when an anomaly is detected or determined, the perception/prediction engine 140 can submit a teleassistance inquiry 143 to the teleassistance module 125. The teleassistance module 125 can treat the inquiry 143 based on the type of anomaly to, for example, compile sensor data 115, prioritize certain types of sensor data 115, encode the sensor data 115 at different rates or qualities, specify an anomalous object in the sensor data 115 (e.g., using a bounding box), and/or incorporating telemetry, diagnostic data, and/or localization data (e.g., position and orientation of the SDV 100) with the inquiry 143. The teleassistance module 125 may then transmit the inquiry 143 to the teleassistance operator(s) 199 for processing. As described herein, the teleassistance operators 199 may be human operators trained to analyze and resolve anomalies. Further, the teleassistance operators 199 can be associated with the backend transport system 190, or may comprise one or more separate entities.

The teleassistance operators 199 may process the teleassistance inquiry 143, determine a resolution to the inquiry 143, and transmit a resolution package 192 back to the communication interface 135 of the SDV 100. The resolution package 192 can comprise a simple identification of an anomalous object, or can comprise instructions for proceeding, such as instructions for the SDV 100 to pull over immediately, instructions to proceed to a nearest service station, or instructions to ignore a particular fault. Detailed description of the teleassistance module 125 in communication with the teleassistance operators 199 is provided below with respect to FIG. 2.

Figure 2:
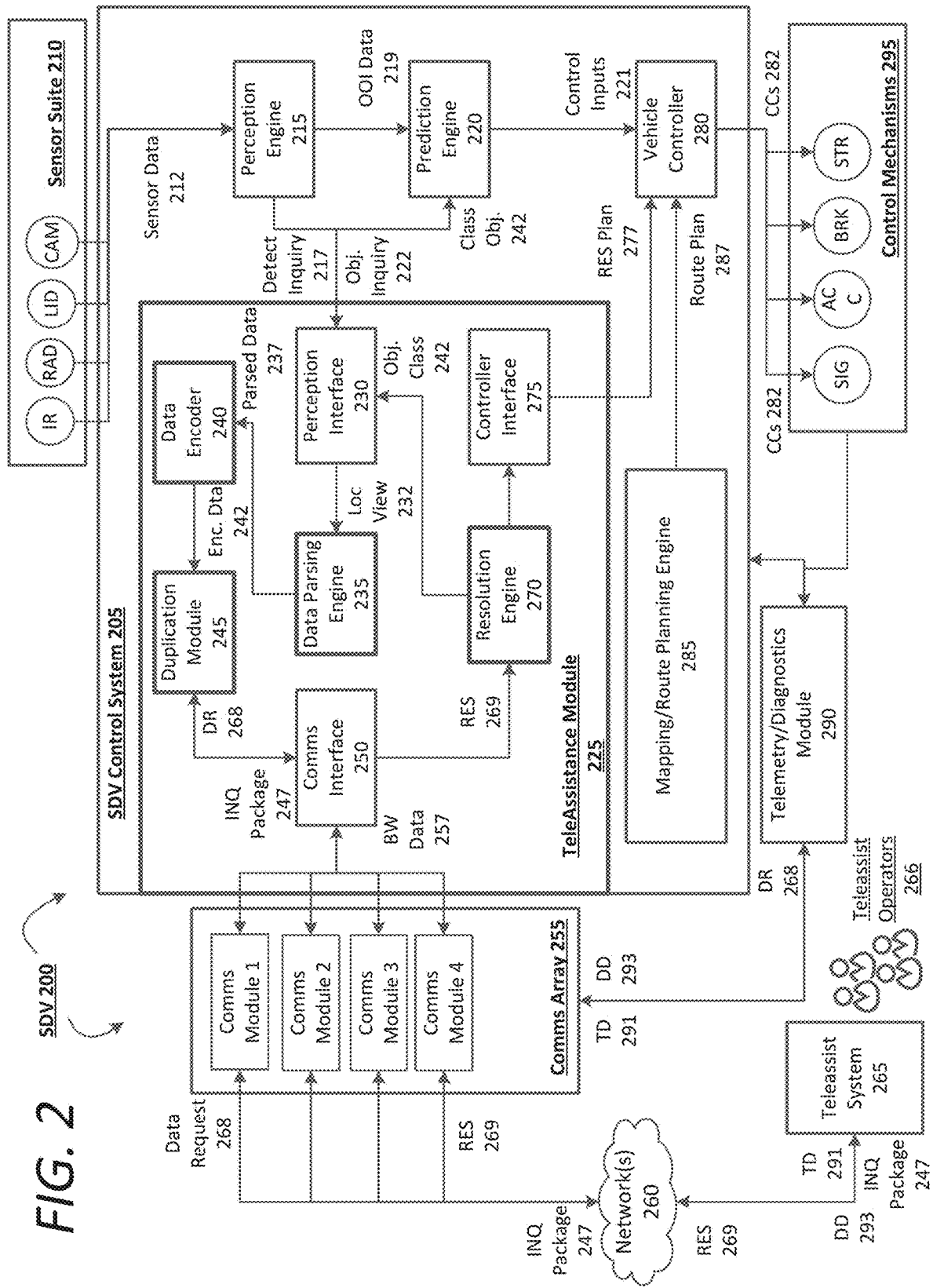
FIG. 2 is a block diagram illustrating an example teleassistance module utilized in connection with a self-driving vehicle, according to examples described herein.

FIG. 2 is a block diagram illustrating an example teleassistance module utilized in connection with a self-driving vehicle, according to examples described herein. In the below description of FIG. 2, certain logical blocks of the SDV 200 of FIG. 2 may be omitted or combined from the SDV 1000 of FIG. 1 for the sake of illustration and emphasis on the features and functions of the teleassistance module 225. Thus, one or more features as shown and described with respect to FIG. 1 may be included as a component of FIG. 2. Furthermore, the teleassistance module 225 as shown and described with respect to FIG. 2 can comprise the teleassistance module 125 of the SDV control system 120 as shown and described with respect to FIG. 1.

Referring to FIG. 2, the SDV 200 can include a sensor suite 210 comprising a number of individual sensor systems, such as a camera system and LIDAR system, and any number of additional sensors. Furthermore, each sensor system can include any number of individual sensors. For example, the camera system can include any number of individual cameras (e.g., monocular cameras and stereoscopic cameras) each having an individual field of view that combined to create the live image view of the SDV 200. Furthermore, the LIDAR system can include any number of individual LIDAR sensors each providing a LIDAR view. The LIDAR system and the camera system can combine to create a complete sensor view for the SDV control system 205 to operate the SDV's control mechanisms 295.

In doing so, the sensor data 212 can be processed by a perception engine 215, which can analyze the sensor data 212 for objects of interest, such as any pedestrians, bicyclists, other vehicles, traffic signals, road signs, and the like. For example, the perception engine 215 can dynamically compare the sensor data 212 with sequential, on-board localization maps of the given region in which the SDV 200 operates, as described herein. The perception engine 215 can identify or otherwise mark the objects of interest, and provide object of interest data 219 to a prediction engine 220, which can predict whether each of the objects of interest present a hazard. For example, the prediction engine 220 can classify each the objects of interest, determine a path and/or velocity for each of the objects of interest, and determine whether the SDV 200 should proceed with caution, brake, weave, accelerate, change lanes, and the like.

In various examples, the prediction engine 220 and the perception engine 215 can combine to provide control inputs 221 to a vehicle controller 280. The control inputs 221 can comprise acceleration, braking, and steering inputs, as well as inputs to engage the auxiliary system, the horn, windshield wipers, etc. The control inputs 221 can be processed by the vehicle controller 280 to generate control commands 282 for each of the relevant control mechanisms 295 of the SDV 200. As provided herein, the SDV 200 can further include a mapping/routing engine 285, which can provide the vehicle controller 280 with a route plan 287 to a destination. Thus, the vehicle controller 280 can proceed along the current route plan 287 on a higher level, and utilize the control inputs 221 from the perception and prediction engines 215, 220 to operate the control mechanisms 295 of the SDV 200. The control commands 282 can be executable be the signaling, acceleration, braking, and steering systems of the SDV 200 that comprise the control mechanisms 295.

As provided herein, the perception engine 215 can identify a detection anomaly, such as debris on a camera sensor or an occlusion in the sensor view. If the detection anomaly is critical or otherwise prevents the perception engine 215 from enabling the SDV 200 to continue along the route plan 287, the perception engine 215 can provide a detection inquiry 217 to a teleassistance module 225 of the SDV 200. For example, the perception engine 215 can analyze the sensor data 212, or live sensor view of the SDV 200, in accordance with a safety standard. As such, if a safety perception threshold is not met, the perception engine 215 can seek assistance from the teleassistance module 225. Furthermore, in some aspects, each of the sensor systems of the sensor suite 210 may be associated with a safety standard. For example, if a field of view of a camera is occluded, or if excessive processing resources of the perception engine 215 are required to resolve the sensor data 212 from the individual sensor systems, the perception engine 215 may submit a detection inquiry 217 specifying the detection anomaly.

As further provided herein, if the prediction engine 220 cannot classify a detected object or otherwise indicates a detected object as indeterminate, the prediction engine 220 may seek assistance from the teleassistance module 225. Specifically, the prediction engine 220 can submit an object inquiry 222 to the teleassistance module 225 in order to resolve the indeterminate object. In certain examples, the prediction engine 220 can attempt to classify objects of interest in accordance with a certainty threshold. If the certainty threshold is not met, then the prediction engine 220 can transmit the object inquiry 22 to the teleassistance module 225.

The teleassistance module 225 can include a perception interface 230 to receive the detection inquiries 217 from the perception engine 215 and the object inquiries 222 from the prediction engine 220. In conjunction with the inquiries 217, 222, the perception interface 230 can receive sensor data 212 corresponding to the inquiries (e.g., live or recorded sensor view data comprising the data from one or more of the sensor systems). The perception interface 230 may then provide a local view 232 specific to the detection anomaly or object classification anomaly to a data parsing engine 235. The local view 232 corresponding to the detected anomaly can comprise data from individual sensor systems pertinent to the detected anomaly. For example, if the anomaly comprises an occlusion in a forward direction, the local view 232 can comprise sensor data 212 from forward sensors of the sensor suite 210 (e.g., a main LIDAR sensor and a number of forward facing cameras). As another example, if the detected anomaly corresponds to an indeterminate object, then the local view 232 can comprise sensor data 212 from sensors detecting the indeterminate object (e.g., a specified LIDAR and/or one or more cameras).

The data parsing engine 235 can parse the local view 232 based on the specific anomaly. For example, if the detected anomaly comprises a detection anomaly, then the data parsing engine 235 may parse the local sensor view 232 to include only LIDAR data or data from specific sensors that may aid in resolving the detected anomaly. Thus, in response to identifying an occlusion in the live sensor view, the data parsing engine 235 can select sensor data 212 from the relevant sensors and/or exclude sensor data 212 from irrelevant sensors. In further examples, if the prediction engine 220 submits an object inquiry 222, the parsing engine 235 can bound the indeterminate object in image data from selected sensors, and can provide the parsed data 237—with the indeterminate object bounded by, for example, a bounding box—to a data encoder 240.

In various examples, the data encoder 240 can determine the quality at which the parsed data 237 is to be compressed or encoded for transmission to the teleassist system 265. The teleassistance module 225 can include a communications interface 250 coupled to a communications array 255 of the SDV 200. The communications interface 250 can receive bandwidth data 257 from each communication module of the communications array 255. In the example shown in FIG. 2, the communications array 255 includes communications modules 1, 2, 3, and 4. However, in implementation, the communications array 255 can comprise any number and combination of communications modules configured for wireless communication using any wireless communications protocol. Such communications protocols can include third generation (3G), fourth generation (4G), long-term evolution (LTE), Wireless Gigabit Alliance (WiGig), WiMax, Wi-Fi, dedicated short range communications (DSRC), BLUETOOTH, and other like communications standards.

In some aspects, the data encoder 240 can determine the manner in which the parsed data 237 is to be compressed or encoded based on the bandwidth data 257 from the communications modules of the communications array 255. In variations, the data encoder 240 can encode the parsed data 237 based on the objects of interest in the data 237. For example, the data encoder 240 can encode the bounded indeterminate object at a higher bitrate than the remainder of the parsed data 237. The data encoder 240 may then submit the encoded data 242 to a duplication module 245, which can determine whether to duplicate transmission of the encoded data 242 based on, for example, the bandwidth data 257 from the communications array 255.

In various aspects, the duplication module 245 can determine that the available bandwidth is sufficient on a selected one of the communications modules, and generate an inquiry data package 247 for transmission over the highest bandwidth communications module, or another communications module having sufficient bandwidth. In one example, the communications array 255 may have communications modules from different wireless communications service providers (e.g., multiple 4G LTE providers), and may select one or the other based on such factors as available bandwidth, historical reliability, cost, location, etc. In certain conditions, the duplication module 245 can opt to transmit the inquiry data package 247 over multiple communications modules of the communications array 255 (e.g., multiple modems of different service providers) in order to ensure adequate data transmission or streaming.

In one example, the duplication module 245 can select communications modules from a plurality of wireless communication modules of the communications array 255, which enable communication with the teleassistance system 265 via a plurality of wireless communication providers (e.g., using multiple separate modems). In response to identifying the detected anomaly in the live sensor view, the duplication module 245 can determine a highest bandwidth communication module from the plurality of wireless communication modules. In some aspects, the duplication module 245 may transmit the teleassistance inquiry 247 to the teleassistance system 265 using the highest bandwidth communication module. In variations, and in accordance with the data prioritization scheme, the duplication module 245 can duplicate transmission of the teleassistance inquiry 247 by transmitting the teleassistance inquiry 247 over a second communication module from the plurality of wireless communication modules. In certain examples, the highest bandwidth communication module and the second communication module can both comprise Long Term Evolution (LTE) communications modules (e.g., from differing service providers). In variations, the highest bandwidth communication module can comprise a LTE communication module and the second communication module can comprise a differing communications type, such as a Wi-Fi module.

In some aspects, the communications array 255 can implement the data prioritization scheme to prioritize transmission or streaming of the inquiry package 247 over other communications (e.g., as a highest priority transmission). The inquiry package 247 can be transmitted or streamed to a teleassistance system 265 over one or more networks 260. As provided herein, the teleassistance system 265 can be included as a component of the transport system 190 shown and described with respect to FIG. 1. Alternatively, the teleassistance system 260 can comprise one or more separate entities, and can provide resolutions to inquiry packages 247 via dedicated computational resources, human teleassistance operators 266, or a combination of both. In one example, human teleassistance operators 266 may be provided with selectable options generated programmatically by computing resources of the teleassistance system 265 in response to the inquiry package 247. The selectable options can comprise commands for the SDV 200, such as commands to ignore an anomaly, wait for an anomaly to self-resolve, power cycle a particular sensor, or maneuver around the anomaly. In variations, the selectable options can include a classification of an object, or can indicate the manner in which to treat the object, such as on a sliding scale between low risk to high risk.

According to various implementations, the SDV 200 can include a telemetry and diagnostics module 290, which can provide diagnostics data 293 and telemetry data 291 to the teleassistance system 265 (e.g., as part of the inquiry data package 247). In certain examples, the telemetry data 291 can indicate a direction of travel and/or velocity of the SDV 200. Additionally, the telemetry data 291 can indicate inputs from the control mechanisms 295, such as braking, steering, and acceleration inputs. The diagnostic data 293 can indicate the diagnostics of certain components of the SDV 200, such as the performance of individual sensors that comprise the sensor suite 210, engine performance, data processing performance, temperature data for the computer stack, engine, batteries, etc., tire pressure data, and the like.

In some aspects, the telemetry data 291 can be transmitted or streamed with the inquiry package 247. As such, the telemetry data 291 can be treated by at least one of the data parsing engine 235, the data encoder 240, or the duplication module 245 prior to transmission to the teleassistance system 265. Accordingly, the teleassistance module 225 can process the telemetry data 291 by, for example, scaling the frequency of telemetry transmissions (e.g., from 50 Hz to 5 Hz), compressing the data transmissions, or dynamically parsing the telemetry data 291 and transmitting only data relevant to a particular anomaly.

In certain implementations, the teleassistance system 265 can make data requests 268 to the SDV 200. In some aspects, a teleassistance operator 266 can transmit a data request 268 to the SDV 200 for more information, such as telemetry data 291 or diagnostics data 293. Such data 291, 293 can indicate whether a detection or object anomaly is due to a component fault or failure. Additionally or alternatively, these data 291, 293 can provide context to a teleassistance operator 266 in the resolution of a specific detection inquiry 217 or object inquiry 222 included in an inquiry data package 247.

The teleassistance system 265 can generate a resolution response 269 to the inquiry package 247, and transmit the response 269 back to the SDV 200. The resolution response 269 can indicate the manner in which the SDV 200 is to respond to a given anomaly. For example, the resolution response 269 can comprise a resolution plan 277 instructing the SDV 200 to wait, proceed with caution, ignore the anomaly, drive to a service station, power cycle a component, and the like. The resolution response 269 can further include information corresponding to the detection inquiry 217 or the object inquiry 222, such as an object classification 242 for an anomalous object, or fault data for a particular sensor (e.g., indicating lens debris, a misaligned sensor, etc.).

In various examples, the teleassistance module 225 can include a resolution engine 270, which can process the resolution response 269. If the resolution response 269 includes an object classification 242 for an anomalous object, the resolution engine 270 can submit the object classification 242 to the perception interface 230, which can transmit the classification 242 to the prediction engine 220. If the resolution response includes a resolution plan 277, then the resolution engine 270 can provide the plan 277 to a controller interface 275 of the teleassistance module 225, which can transmit the resolution plan 277 to the vehicle controller 280. Thus, the vehicle controller 280 can cause the SDV 200 to proceed in accordance with the resolution plan 277, modulating inputs to the control mechanisms 295 of the SDV 200 accordingly.

According to examples provided herein, the perception engine 215, prediction engine 220, and vehicle controller 280 can communicate with the on-board teleassistance module 225 to resolve detection and object anomalies. The teleassistance module 225 can monitor bandwidth data 257 for each communications module of the communications array 255 in order to parse, prioritize, bound, encode, compress, and/or duplicate data to be transmitted to the teleassistance system 265. Further, in generating an inquiry package 247, the teleassistance module 225 can encode separate portions of the sensor data 212 (e.g., a bounding box for a video stream encompassing an anomalous object). The inquiry package 247 can include a live sensor view of one or more sensors the SDV 200. For example, the live sensor view can comprise image data from a particular camera that detects an anomalous object. Thus, the teleassistance module 225 can ensure that inquiry packages 247 are reliably transmitted or streamed to the teleassistance system 265, and can also reduce or minimize impact on bandwidth through select encoding of the sensor data 212.

Self-Driving Vehicle in Operation

Figure 3:
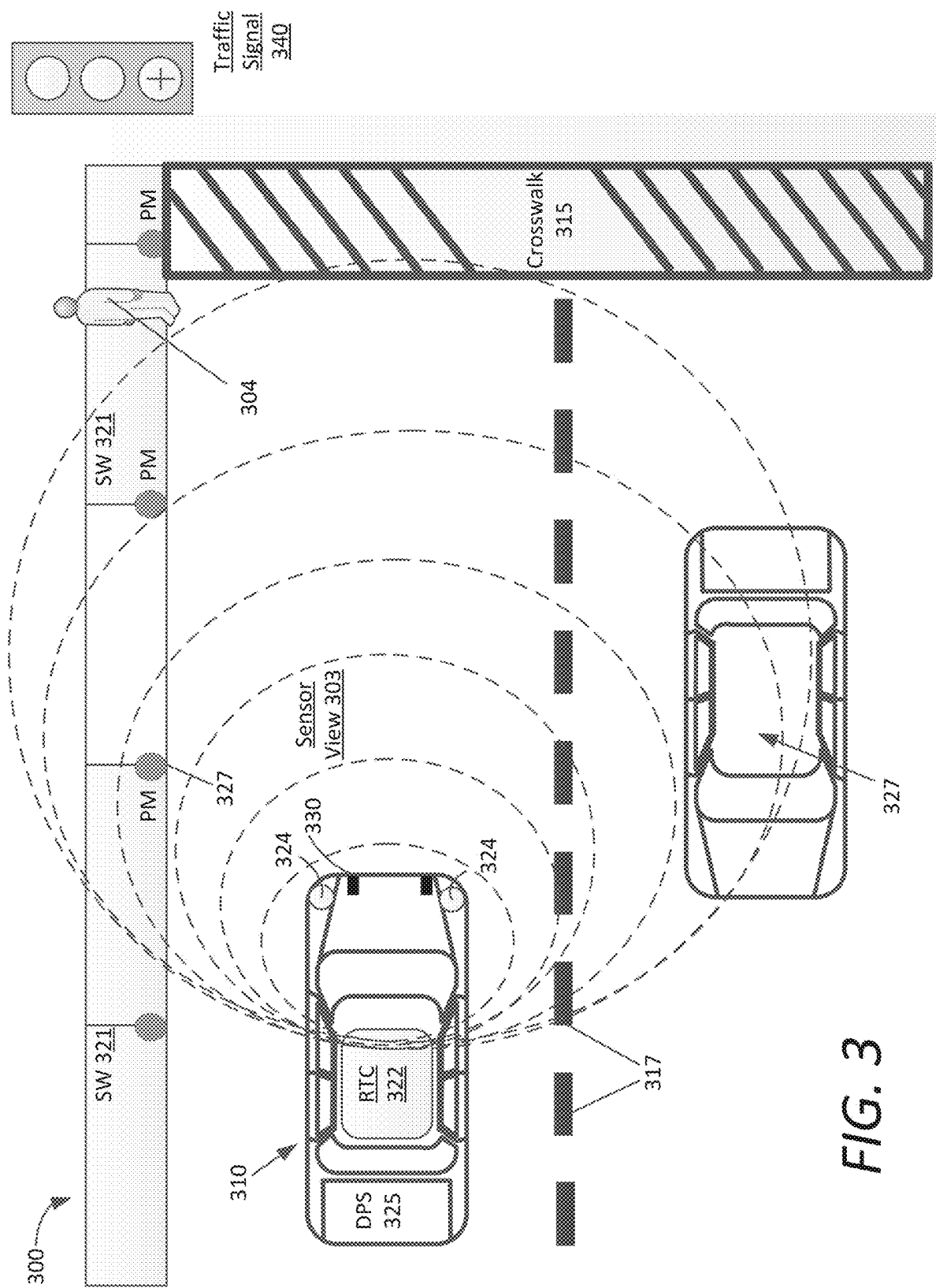
FIG. 3 shows an example of an autonomously controlled self-driving vehicle utilizing sensor data to navigate an environment in accordance with example implementations.

FIG. 3 shows an example of an autonomously controlled self-driving vehicle utilizing sensor data to navigate an environment in accordance with example implementations. In an example of FIG. 3, the autonomous vehicle 310 may include various sensors, such as a roof-top camera array (RTC) 322, forward-facing cameras 324 and laser rangefinders 330. In some aspects, a data processing system 325, comprising a computer stack that includes a combination of one or more processors, FPGAs, and/or memory units, can be positioned in the cargo space of the vehicle 310.

According to an example, the vehicle 310 uses one or more sensor views 303 (e.g., a stereoscopic or 3D image of the environment 300) to scan a road segment on which the vehicle 310 traverses. The vehicle 310 can process image data or sensor data, corresponding to the sensor views 303 from one or more sensors in order to detect objects that are, or may potentially be, in the path of the vehicle 310. In an example shown, the detected objects include a pedestrian 304 and another vehicle 327—each of which may potentially cross into a road segment along which the vehicle 310 traverses. The vehicle 310 can use information about the road segment and/or image data from the sensor views 303 to determine that the road segment includes a divider 317 and an opposite lane, as well as a sidewalk (SW) 321, and sidewalk structures such as parking meters (PM) 327.

The vehicle 310 may determine the location, size, and/or distance of objects in the environment 300 based on the sensor view 303. For example, the sensor views 303 may be 3D sensor images that combine sensor data from the roof-top camera array 322, front-facing cameras 324, and/or laser rangefinders 330. Accordingly, the vehicle 310 may accurately detect the presence of objects in the environment 300, allowing the vehicle 310 to safely navigate the route while avoiding collisions with other objects.

According to examples, the vehicle 310 may determine a probability that one or more objects in the environment 300 will interfere or collide with the vehicle 310 along the vehicle's current path or route. In some aspects, the vehicle 310 may selectively perform an avoidance action based on the probability of collision. The avoidance actions may include velocity adjustments, lane aversion, roadway aversion (e.g., change lanes or drive further from the curb), light or horn actions, and other actions. In some aspects, the avoidance action may run counter to certain driving conventions and/or rules (e.g., allowing the vehicle 310 to drive across center line to create space for bicyclist).

The SDV 310 can further detect certain road features that can increase the vehicle's alertness, such as a crosswalk 315 and a traffic signal 340. In the example shown in FIG. 3, the SDV 310 can identify certain factors that can cause the vehicle 310 to enter a high alert state, such as the pedestrian 304 being proximate to the crosswalk 315. Furthermore, the SDV 310 can identify the signal state of the traffic signal 340 (e.g., green) to determine acceleration and/or braking inputs as the SDV 310 approaches the intersection. At any given time, the SDV 310 can detect an anomaly—such as an indeterminate object or an issue with a sensor—and query a backend teleassistance system to resolve the anomaly.

Figure 4:
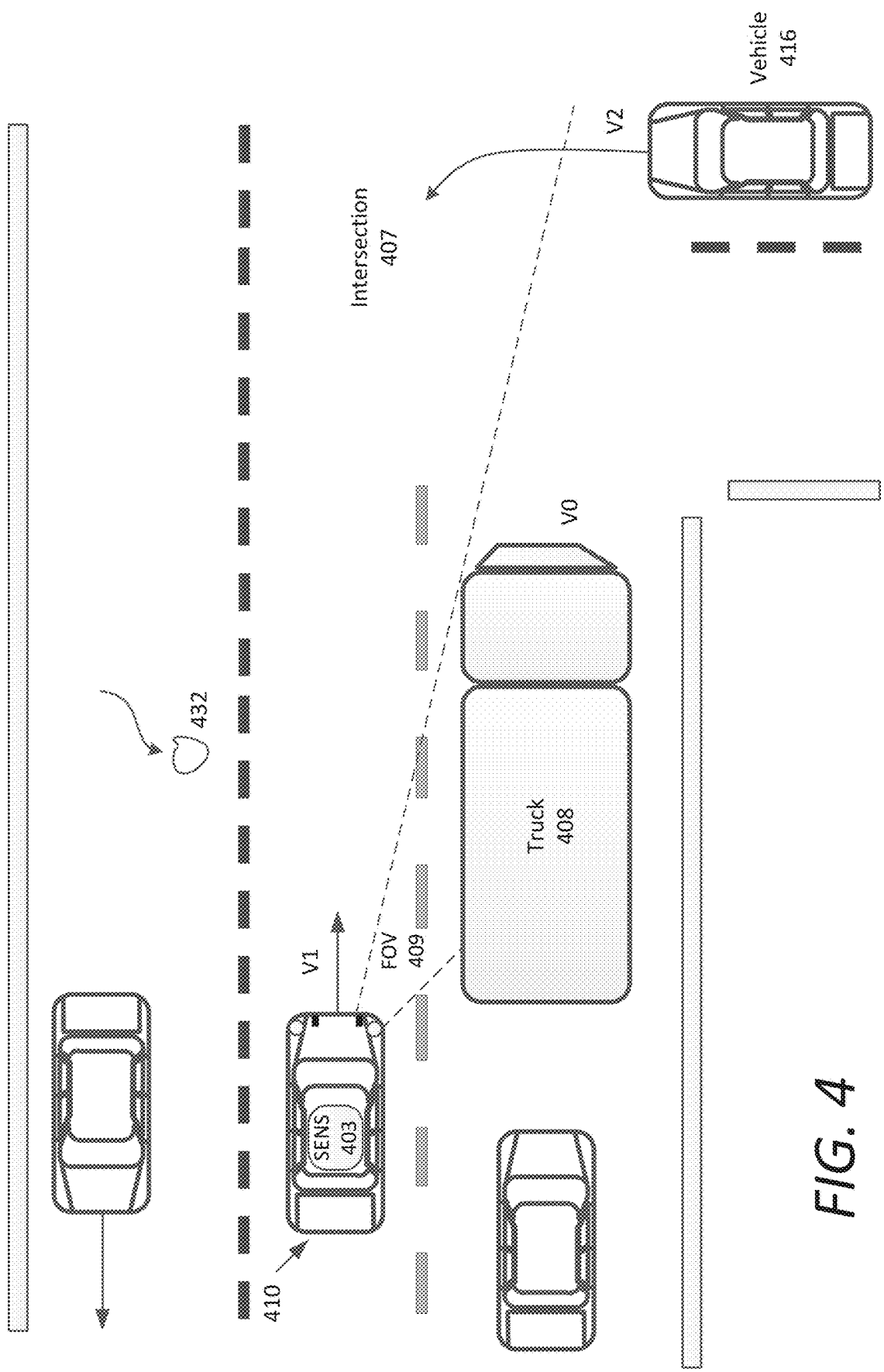
FIG. 4 shows an example self-driving vehicle executing a resolution response from a backend teleassistance operator, in accordance with example implementations.

FIG. 4 shows an example self-driving vehicle executing a resolution response from a backend teleassistance operator, for illustrative purposes. In the example shown in FIG. 4, a self-driving vehicle (SDV) 410 can navigate an environment and approach an intersection 407. A truck 408 may be parked in an adjacent lane or parking space, and can cause an occlusion in the field of view 409 of one or more sensors 403 of the SDV 410. For example, the occlusion may be blocking a vehicle 416 that is entering the intersection 407. This occlusion can comprise a detection anomaly, and can trigger the perception and prediction resources of the SDV 410 to slow or stop the SDV 410 to ensure safety.

According to examples described herein, the SDV 410 can transmit a teleassistance inquiry indicating the occlusion caused by the parked truck 408 blocking its view of the intersection 407. A resolution response from the teleassistance system can comprise instructions for the SDV 410 to proceed slowly forward in a high caution state, which can enable the SDV 410 to identify the vehicle 416, and safely proceed through the intersection 407.

In another example of FIG. 4, the SDV 410 can detect an anomalous object 432, which may cause the SDV 410 to slow or stop. As provided herein, the SDV 410 can transmit a teleassistance inquiry to the teleassistance system to resolve the anomalous object. In various examples, the teleassistance system can transmit a resolution response that classifies the anomalous object (e.g., as a low risk object), or specifies the object (e.g., as a plastic bag). The SDV 410 may then proceed according to the classification of the object by ignoring the object, waiting, or proceeding with caution.

Methodology

Figure 5A:
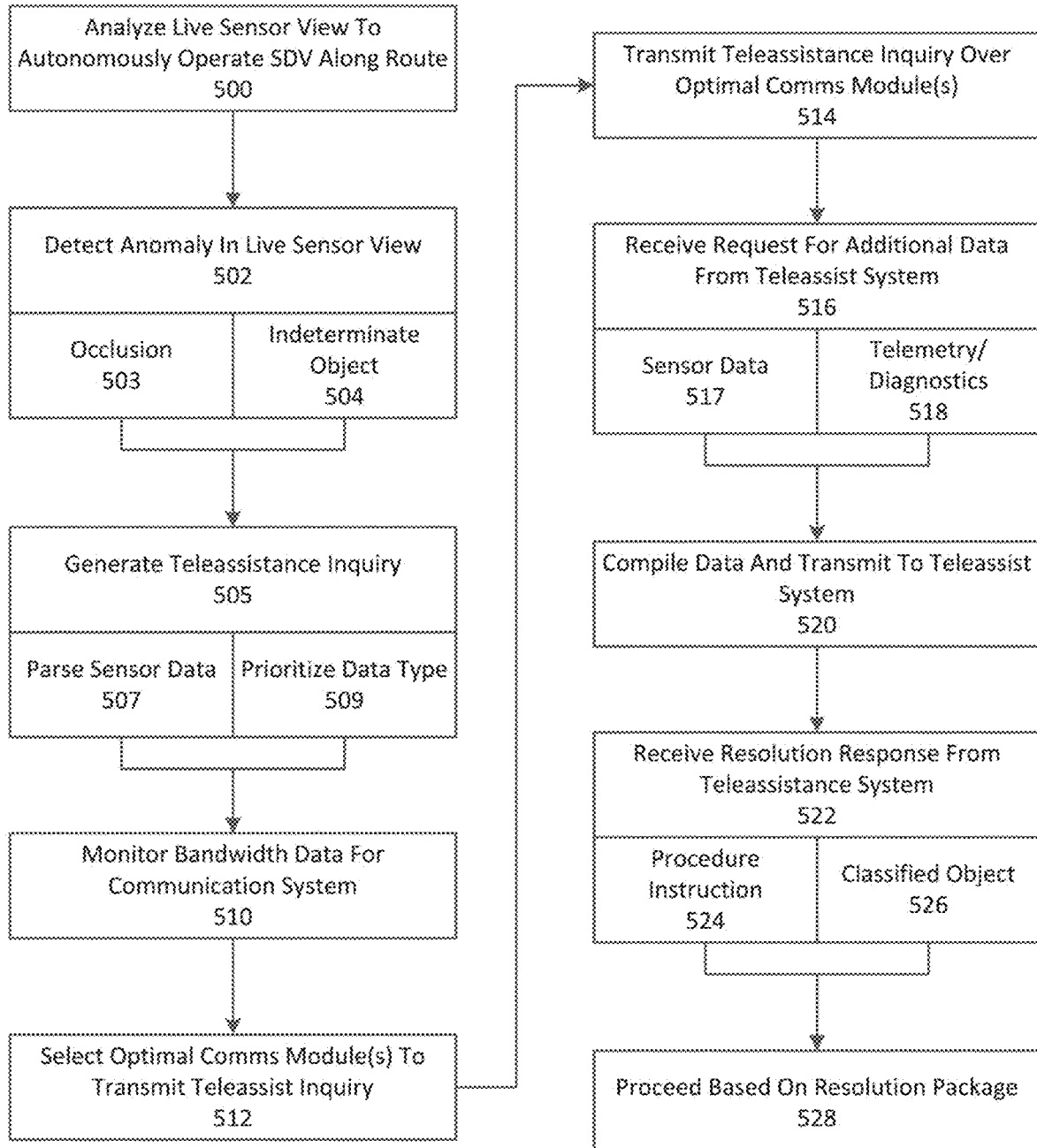
FIGS. 5A and 5B are flow charts describing example methods of operating a self-driving vehicle using teleassistance, according to examples described herein.
Figure 5B:
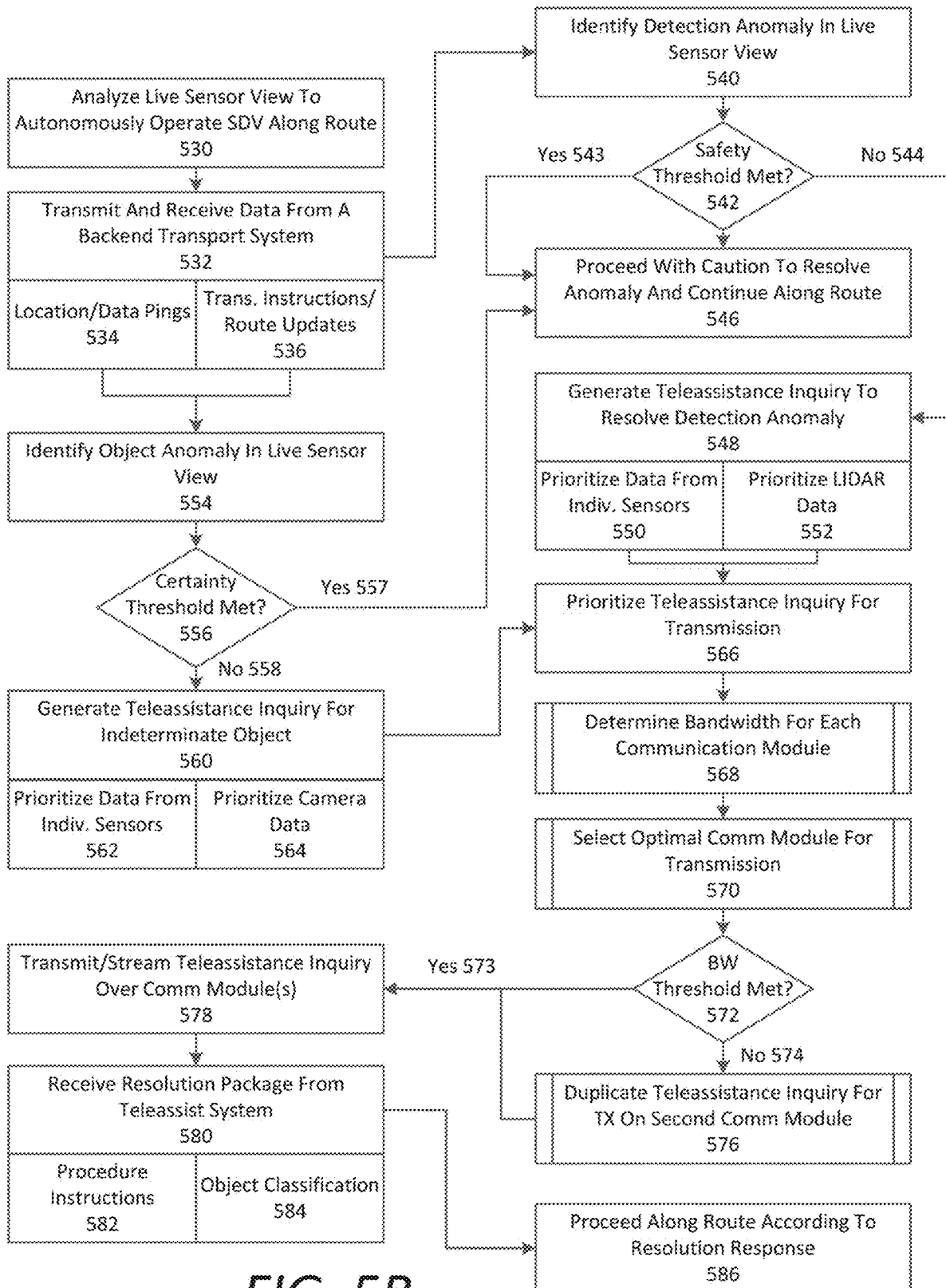
Figure 6:
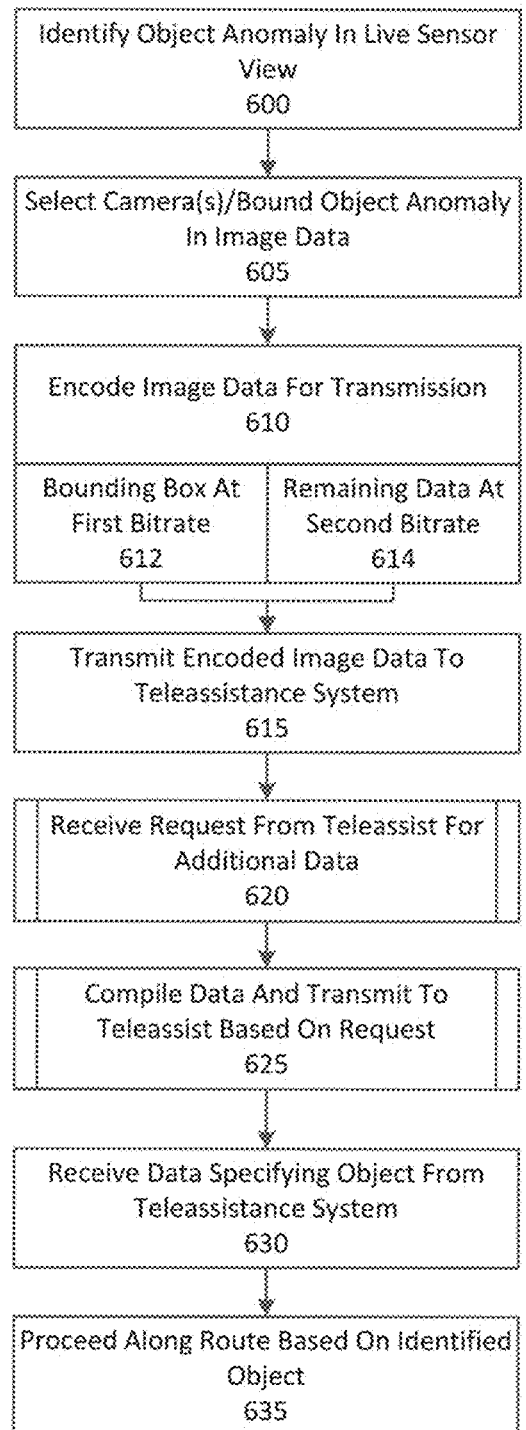
FIG. 6 is another flow chart describing an example method of operating a self-driving vehicle using teleassistance, according to examples described herein.

FIGS. 5A, 5B, and 6 are flow charts describing example methods of operating a self-driving vehicle using teleassistance, according to examples described herein. In the below descriptions of FIGS. 5A, 5B, and 6, reference may be made to reference characters representing like features as shown and described with respect to FIGS. 1 and 2. Furthermore, the individual processes discussed with respect to FIGS. 5A, 5B, and 6 may be performed by an example SDV control system 120 implementing a teleassistance module 125, 225 as shown and described in FIGS. 1 and 2. Accordingly, in the below descriptions of FIGS. 5A, 5B, and 6, reference may be made interchangeably to the SDV 100, 200 in general and/or the SDV control system 120 implementing a teleassistance module 125, 225 of FIGS. 1 and 2. Still further, it is contemplated that a particular step described either individually or as part of an additional step can be combined with or omitted from other individually described steps of FIGS. 5A, 5B, and 6.

Referring to FIG. 5A, the control system 120 can analyze a live sensor view of the SDV 100 in order to autonomously operate the SDV 100 along a given route 139 (500). While operating the SDV 100, the control system 120 can detect an anomaly in the live sensor view (502). As described herein, the anomaly can comprise at least one of a detection anomaly, such as an occlusion (503), or an object anomaly, such as an indeterminate object (504). Based on the detected anomaly, the control system 120 can generate a teleassistance inquiry 143 for transmission to a backend teleassistance system 265 over one or more networks 260 (505). In certain implementations, the control system 120 can parse the sensor data 115 to determine a particular sensor and/or a particular portion or view field of the sensor data 115 in includes the detected anomaly (507). Additionally or alternatively, the control system 120 can prioritize the sensor data type based on the detection anomaly (509). As an example, for object anomalies, the control system 120 can prioritize image data as opposed to LIDAR data or radar data for transmission to the teleassistance system 265. As another example, for detection anomalies (e.g., an occlusion), the control system 120 can prioritize LIDAR data over image data.

In some implementations, the control system 120 can monitor the bandwidth data of the SDV's communication system 255 (510). The bandwidth data can indicate the available bandwidth or transmission performance of each communications module (e.g., a 4G LTE modem) of the SDV 100. Based on the bandwidth data, the control system 120 can select one or more optimal communications modules to transmit the teleassistance inquiry 143 (512), and transmit the teleassistance inquiry 143 over the optimal communications module(s) (514).

In some aspects, the control system 120 can receive a request 268 for addition data from the teleassistance system 265 (516). For example, the request 268 can be for additional sensor data 115, or more detailed sensor data 115, to provide additional context to the detected anomaly (517). Additionally or alternatively, the request 268 may be for telemetry data 291 or diagnostics data 293 for added context. In response to the data request 268, the control system 120 can compile the requested data, and transmit or stream the data to the teleassistance system 265.

Based on the teleassistance inquiry 143, the control system 120 can receive a resolution response 269 from the teleassistance system 265 (522). The resolution response 269 can include a procedure instruction indicating the manner in which the control system 120 should proceed, or can indicate a classified object 242 (e.g., specifying the anomalous object as a ball, bag, cat, manhole cover, mattress, etc.) (526). Based on the resolution response 269, the control system 120 can proceed accordingly.

FIG. 5B is a flow chart describing a lower level method of operating an SDV 100, 200 using a teleassistance module 125, 225, as provided herein. Referring to FIG. 5B, the control system 120 can analyze the live sensor view to autonomously operate the SDV 100 along a given route 139 (530). While operating the SDV 100, the control system 120 can transmit and receive data from a backend transport system 190 that manages routing for a fleet of SDVs operating throughout the given region (532). These data transmissions can include periodic location and/or data pings 121 to the transport system 190 (534), and can further include transportation instructions and/or route updates (536).

In various examples, the control system 120 can identify a detection anomaly in the live sensor view (540). The detection anomaly can indicate an underlying issue in the sensor data, such as debris on a lens, a misalignment, an occlusion in the field of view of one or more sensors, and the like. In treating the detection anomaly, the control system 120 can determine whether a safety threshold or detection hazard threshold is met (542). For example, the control system 120 can determine a value for the sensor data quality to determine whether the sensor data is usable, or can determine that a collision probability is increased above a certain tolerance range due to the detection anomaly.

If the safety threshold is still met (543), then the control system 120 can proceed with caution to resolve the detection anomaly and continue along the given route 139 (546). However, if the safety threshold is not met (544), then the control system 120 can generate a teleassistance inquiry 143 to resolve the detection anomaly (548). In generating the teleassistance inquiry 143, the control system 120 can prioritize data from certain sensors, such as sensors having a relevant field of view that covers the detection anomaly, or a sensor experiencing detection issues (550). In variations, the control system 120 can have a default option for detection anomalies, in which the control system 120 automatically prioritizes LIDAR data (e.g., to resolve an occlusion) (552).

According to some examples, the control system 120 can identify an object anomaly in the live sensor view—or an indeterminate object that the perception/prediction engine 140 is unable to classify (554). In treating object anomalies, the control system 120 can determine whether a certainty threshold is met for the object (556). For example, the perception/prediction engine 140 can identify an object in the sensor data 115 that is in the path of the SDV 100 and attempt to identify or classify the object. In this example, if a 95% threshold is not met for the object in the path of the SDV 100, then the control system 120 can generate a teleassistance inquiry 143 for the indeterminate object.

Accordingly, if the certainty threshold is met (557), then the control system 120 can proceed with caution along the route 139 having resolved the object anomaly. However, if the certainty threshold is not met (558), then the control system 120 can generate a teleassistance inquiry 143 for the indeterminate object (560). In generating the teleassistance inquiry 143, the control system 120 can also prioritize data from individual sensors, such as an individual camera having the indeterminate object in its field of view (562). Additionally or alternative, the control system 120 can, by default, prioritize camera data or video streams over other data types for object anomalies (564).

Whether the detected or identified anomaly comprises a detection anomaly or an object anomaly, the control system 120 can also prioritize the teleassistance inquiry 143 for transmission over the SDV's communications system 255 (566). In some aspects, the control system 120 can do so by determining bandwidth information for each communication module of the communication system 255 (568), and selecting one or more optimal communications modules for transmission (570). Additionally or alternatively, the control system 120 can determine whether an available bandwidth threshold is met for the selected communications module(s) or the communications system 255 in general. If so (573), then the control system 120 can transmit or stream the teleassistance inquiry 143 to the teleassistance system 265 over the selection communications module(s) (578). However, if not (574), then the control system 120 can duplicate the teleassistance inquiry 143 or a portion thereof (e.g., a portion of the sensor data) for transmission over one or more separate communications module (576), and transmit the teleassistance inquiry 143 and duplicated data over the communications modules (578).

According to examples, the control system 120 may then receive a resolution response 269 from the teleassistance system 265 (580). As described, the resolution response 269 can include procedure instructions indicating the manner in which the SDV 100 is to proceed to resolve a detection anomaly (582), or an object classification 242 specifying or classifying an indeterminate object (584). Based on the resolution response 269, the control system 120 can proceed along the route or an alternative route (586).

FIG. 6 is a flow chart describing an example method of resolving a detected anomaly by a self-driving vehicle, in accordance with examples described herein. One or more processes discussed with respect to FIG. 6 may be performed in conjunction with, or as additional processes of the steps described in connection with the flow charts of FIGS. 5A and 5B. Referring to FIG. 6, the control system 120 of the SDV 100 can identify an object anomaly in the live sensor view of the SDV 100 (600). In some examples, the control system 120 can select one or more cameras having a field of view that includes the object anomaly, and bound the object anomaly in the image data of the selected one or more cameras (605). As used herein, the image data can comprise live video data from the one or more cameras, and the control system 120 can bound the object anomaly dynamically as the SDV 100 moves. Furthermore, the object anomaly can comprise an indeterminate object in which the perception and/or prediction resources of the control system 120 are unable to classify or specify with certainty (e.g., above a certainty threshold).

By bounding the object anomaly, the control system 120 can then encode the image data for transmission over one or more communications modules of the SDV 100 (610). In various implementations, the control system 120 can encode the bounded area (e.g., a bounding box) including the object anomaly at a first bitrate (612), and encode the remaining image data at a second bitrate (614), for example, in order to decrease or minimize impact on bandwidth usage. The control system 120 may then transmit or stream the image data to a remote teleassistance system 265 over one or more networks 260 (615).

In some aspects, the control system 120 can receive a data request 268 for additional data, such as additional image data, radar data, or LIDAR data (620). In response to the data request, 268, the control system 120 can compile the requested data and transmit or stream the data to the teleassistance system 265 over the one or more networks 260 (625). According to examples provided herein, the control system 120 can receive data specifying or classifying the object anomaly from the teleassistance system 265 (630). Based on the determined object, the control system 120 can cause the SDV 100 to proceed along the current route 139 or an alternate route accordingly (635). For example, the control system 120 can ignore the object if the object comprises a low risk object, such as a plastic bag. As another example, the control system 120 can wait or carefully maneuver around the object if the object could cause damage to the SDV 100 or if the object comprises a high risk object, such as an animal or a baby stroller.

Hardware Diagrams

Figure 7:
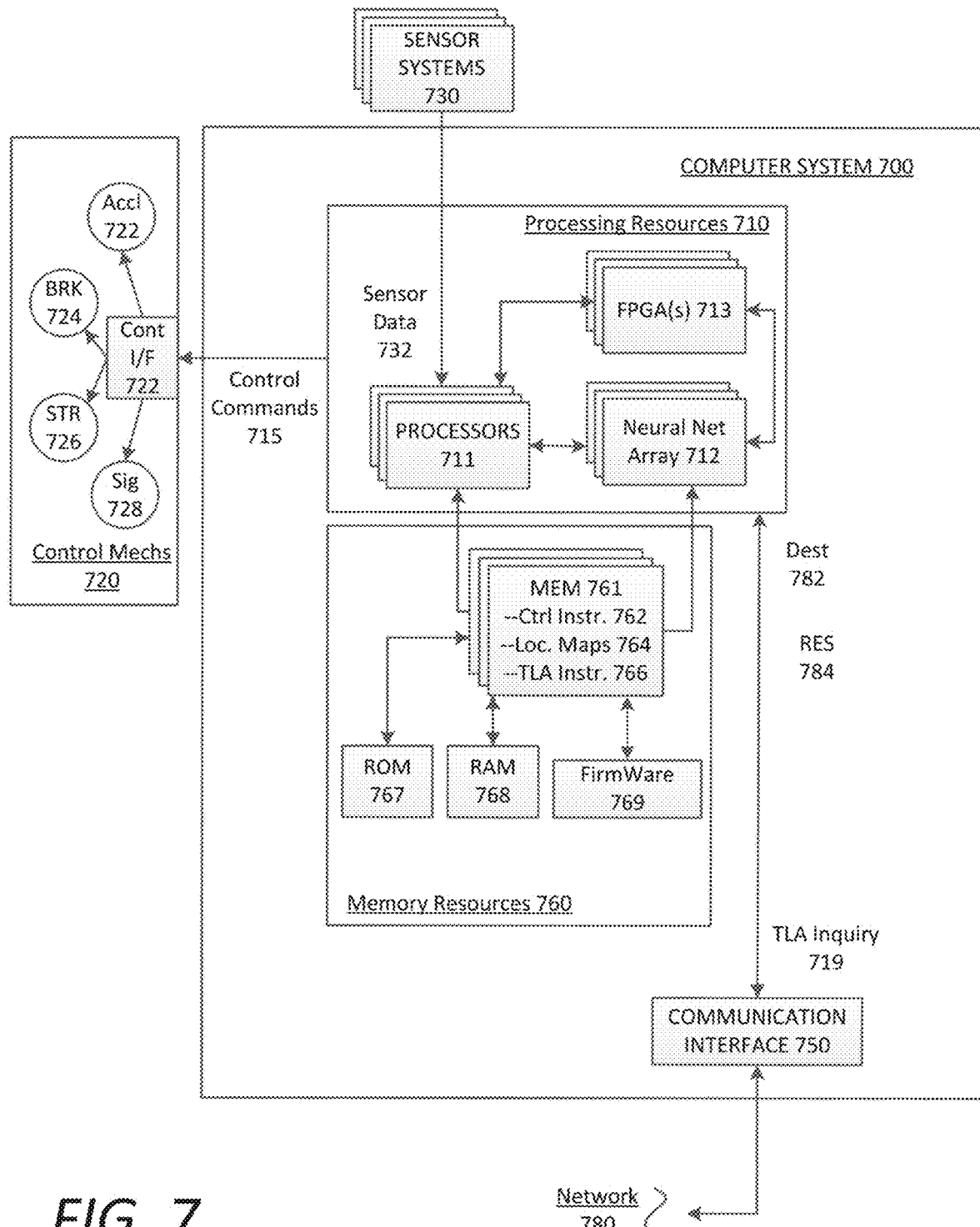
FIG. 7 is a block diagram illustrating a computer system for a self-driving vehicle upon which examples described herein may be implemented.

FIG. 7 is a block diagram illustrating a computer system upon which example SDV processing systems described herein may be implemented. The computer system 700 can be implemented using a number of processing resources 710, which can comprise processors 711, field programmable gate arrays (FPGAs) 713. In some aspects, any number of processors 711 and/or FPGAs 713 of the computer system 700 can be utilized as components of a neural network array 712 implementing a machine learning model and utilizing road network maps stored in memory 761 of the computer system 700. In the context of FIGS. 1 and 2, various aspects and components of the control system 120, 205, route planning engine 160, 285, and perception and prediction engines 140, 215, 220, can be implemented using one or more components of the computer system 700 shown in FIG. 7.

According to some examples, the computer system 700 may be implemented within an autonomous vehicle or self-driving vehicle (SDV) with software and hardware resources such as described with examples of FIGS. 1 and 2. In an example shown, the computer system 700 can be distributed spatially into various regions of the SDV, with various aspects integrated with other components of the SDV itself. For example, the processing resources 710 and/or memory resources 760 can be provided in a cargo space of the SDV. The various processing resources 710 of the computer system 700 can also execute control instructions 762 using microprocessors 711, FPGAs 713, a neural network array 712, or any combination of the same.

In an example of FIG. 7, the computer system 700 can include a communication interface 750 that can enable communications over a network 780. In one implementation, the communication interface 750 can also provide a data bus or other local links to electro-mechanical interfaces of the vehicle, such as wireless or wired links to and from control mechanisms 720 (e.g., via a control interface 722), sensor systems 730, and can further provide a network link to a backend transport management system (implemented on one or more datacenters) over one or more networks 780. For example, the processing resources 710 can receive a destination 782 over the one or more networks 780, or via a local user interface of the SDV.

The memory resources 760 can include, for example, main memory 761, a read-only memory (ROM) 767, storage device, and cache resources. The main memory 761 of memory resources 760 can include random access memory (RAM) 768 or other dynamic storage device, for storing information and instructions which are executable by the processing resources 710 of the computer system 700. The processing resources 710 can execute instructions for processing information stored with the main memory 761 of the memory resources 760. The main memory 761 can also store temporary variables or other intermediate information which can be used during execution of instructions by the processing resources 710. The memory resources 760 can also include ROM 767 or other static storage device for storing static information and instructions for the processing resources 710. The memory resources 760 can also include other forms of memory devices and components, such as a magnetic disk or optical disk, for purpose of storing information and instructions for use by the processing resources 710. The computer system 700 can further be implemented using any combination of volatile and/or non-volatile memory, such as flash memory, PROM, EPROM, EEPROM (e.g., storing firmware 769), DRAM, cache resources, hard disk drives, and/or solid state drives.

The memory 761 may also store localization maps 764 in which the processing resources 710—executing the control instructions 762—continuously compare to sensor data 732 from the various sensor systems 730 of the SDV. Execution of the control instructions 762 can cause the processing resources 710 to generate control commands 715 in order to autonomously operate the SDV's acceleration 722, braking 724, steering 726, and signaling systems 728 (collectively, the control mechanisms 720). Thus, in executing the control instructions 762, the processing resources 710 can receive sensor data 732 from the sensor systems 730, dynamically compare the sensor data 732 to a current localization map 764, and generate control commands 715 for operative control over the acceleration, steering, and braking of the SDV. The processing resources 710 may then transmit the control commands 715 to one or more control interfaces 722 of the control mechanisms 720 to autonomously operate the SDV through road traffic on roads and highways, as described throughout the present disclosure.

The memory 761 may also store teleassistance instructions 766 that the processing resources 710 can execute to identify detection or object anomalies, and transmit teleassistance inquiries 719 to a backend transport system or teleassistance system over the network 780, and receive a resolution response 784 in return. Execution of the instructions 762, 764, 766 can cause the processing resources 710 to process the resolution response 784 accordingly to resolve the detected anomaly. Thereafter, the processing resources 710 can generate control commands 715 to cause the control mechanisms 720 to autonomously operate the SDV along the current route or an alternate route accordingly.

Figure 8:
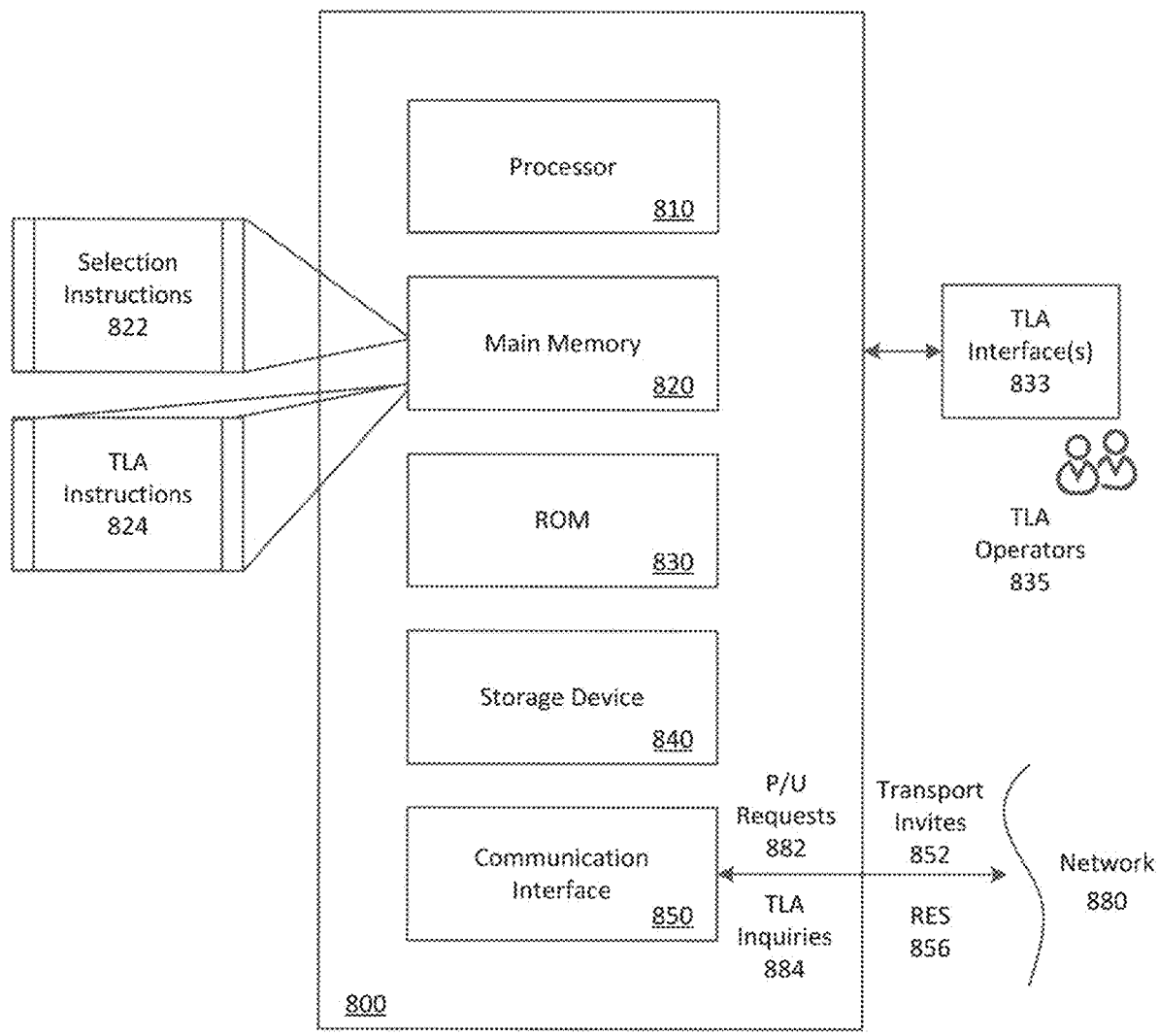
FIG. 8 is a block diagram illustrating a computer system for a backend datacenter upon which example transport systems described herein may be implemented.

FIG. 8 is a block diagram that illustrates a computer system upon which examples described herein may be implemented. A computer system 800 can be implemented on, for example, a server or combination of servers. For example, the computer system 800 may be implemented as part of a network service for providing transportation services. In the context of FIGS. 1 and 2, the transport system 190 or teleassistance system 265 may be implemented using a computer system 800 such as described by FIG. 8.

In one implementation, the computer system 800 includes processing resources 810, a main memory 820, a read-only memory (ROM) 830, a storage device 840, and a communication interface 850. The computer system 800 includes at least one processor 810 for processing information stored in the main memory 820, such as provided by a random access memory (RAM) or other dynamic storage device, for storing information and instructions which are executable by the processor 810. The main memory 820 also may be used for storing temporary variables or other intermediate information during execution of instructions to be executed by the processor 810. The computer system 800 may also include the ROM 830 or other static storage device for storing static information and instructions for the processor 810. A storage device 840, such as a magnetic disk or optical disk, is provided for storing information and instructions.

The communication interface 850 enables the computer system 800 to communicate over one or more networks 880 (e.g., cellular network) through use of the network link (wireless or wired). Using the network link, the computer system 800 can communicate with one or more computing devices, one or more servers, and/or one or more self-driving vehicles. In accordance with examples, the computer system 800 can receive pick-up requests 882 from mobile computing devices of individual users. The executable instructions stored in the memory 830 can include selection instructions 822, which the processor 810 executes to select an optimal driver or SDV to service the pick-up request 882. In doing so, the computer system can receive vehicle locations of drivers and SDVs operating throughout the given region, and the processor can execute the selection instructions 822 to select an optimal driver or SDV from a set of available vehicles, and transmit a transport invitation 852 to enable the driver to accept or decline the ride service offer, or to instruct the matched SDV to rendezvous with the requesting user.

The executable instructions stored in the memory 820 can also include teleassistance instructions 824, which enables the computer system 800 to receive teleassistance inquiries 884 from SDVs operating throughout the given region. In some aspects, execution of the teleassistance instructions 824 can cause the computer system 800 to automatically generate a resolution response 856. In addition or as a variation, the computer system 800 can transmit the teleassistance inquiries 884 over one or more teleassistance interfaces 833 to human teleassistance operators 835, which can cause the resolution responses 856 to be generated and then transmitted back to the SDVs in order to resolve detected anomalies.

By way of example, the instructions and data stored in the memory 820 can be executed by the processor 810 to implement an example transport system 190 or teleassistance system 265 of FIGS. 1 and 2. In performing the operations, the processor 810 can receive pick-up requests 882 and submit transport invitations 852 to facilitate the servicing of the requests 882. Furthermore, the processor 810 can receive teleassistance inquiries 884 from SDVs operating throughout the given region, and provide resolution responses 856 accordingly.

The processor 810 is configured with software and/or other logic to perform one or more processes, steps and other functions described with implementations, such as described with respect to FIGS. 1-6, and elsewhere in the present application. Examples described herein are related to the use of the computer system 800 for implementing the techniques described herein. According to one example, those techniques are performed by the computer system 800 in response to the processor 810 executing one or more sequences of one or more instructions contained in the main memory 820. Such instructions may be read into the main memory 820 from another machine-readable medium, such as the storage device 840. Execution of the sequences of instructions contained in the main memory 820 causes the processor 810 to perform the process steps described herein. In alternative implementations, hard-wired circuitry may be used in place of or in combination with software instructions to implement examples described herein. Thus, the examples described are not limited to any specific combination of hardware circuitry and software.

It is contemplated for examples described herein to extend to individual elements and concepts described herein, independently of other concepts, ideas or systems, as well as for examples to include combinations of elements recited anywhere in this application. Although examples are described in detail herein with reference to the accompanying drawings, it is to be understood that the concepts are not limited to those precise examples. As such, many modifications and variations will be apparent to practitioners skilled in this art. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mention of the particular feature. Thus, the absence of describing combinations should not preclude claiming rights to such combinations.

What is claimed is:

1. A system comprising:
a network communication interface;
one or more processors; and
a memory storing instructions that, when executed by the one or more processors, cause the system to:
analyze a live sensor view generated by a set of sensors of a self-driving vehicle (SDV) in accordance with a safety threshold to (i) detect objects of interest along a route, and (ii) classify each respective object of the detected objects of interest;
for a particular object of the detected objects of interest, determine that the safety threshold is not met;
in response to determining that the safety threshold is not met for the particular object, transmit, using the network communication interface, a first teleassistance inquiry to a backend computing system, the first teleassistance inquiry comprising LIDAR data generated by a LIDAR device of the SDV, wherein the set of sensors of the SDV includes sensors of the LIDAR device;
determine that a classification of one or more of the detected objects of interest does not satisfy a certainty threshold;
in response to determining that the classification of the one or more of the detected objects of interest does not satisfy the certainty threshold, transmit, using the network communication interface, a second teleassistance inquiry to the backend computing system, the second teleassistance inquiry comprising image data generated by one or more cameras of the SDV, the image data including the one or more of the detected objects of interest, wherein the set of sensors of the SDV includes sensors of the one or more cameras, and wherein the second teleassistance inquiry is different from the first teleassistance inquiry;
for each of the first and the second teleassistance inquiries, receive a resolution response from the backend computing system; and
provide a control system of the SDV with data corresponding to the resolution response to enable the SDV to proceed in accordance with the resolution response.

2. The system of claim 1, wherein the safety threshold not being met corresponds to an obstruction in the live sensor view.

3. The system of claim 1, wherein the executed instructions cause the system to transmit LIDAR data and not image data when the safety threshold is not met.

4. The system of claim 1, wherein the executed instructions cause the system to transmit image data and not LIDAR data when the certainty threshold is not met.

5. The system of claim 1, wherein the executed instructions further cause the system to:
monitor bandwidth of each of a plurality of wireless communication modules of the network communication interface to determine a highest bandwidth communication module;
wherein the executed instructions cause the system to transmit each of the first and the second teleassistance inquiries to the backend computing system using the highest bandwidth communication module.

6. The system of claim 5, wherein the executed instructions further cause the system to:
duplicate transmission of each of the first and the second teleassistance inquiries by transmitting the first and the second teleassistance inquiries over a second communication module from the plurality of wireless communication modules.

7. The system of claim 6, wherein the highest bandwidth communication module and the second communication module both comprise Long Term Evolution (LTE) communications modules.

8. The system of claim 6, wherein the highest bandwidth communication module comprises a LTE communication module and the second communication module comprises a Wi-Fi module.

9. The system of claim 1, wherein the first and the second teleassistance inquiries include telemetry data for the SDV.

10. The system of claim 1, wherein the first and the second teleassistance inquiries include localization information for the SDV.

11. The system of claim 1, wherein the first and the second teleassistance inquiries include diagnostics data for the SDV.

12. A non-transitory computer readable medium storing instructions that, when executed by one or more processors, cause the one or more processors to:

analyze a live sensor view generated by a set of sensors of a self-driving vehicle (SDV) in accordance with a safety threshold to (i) detect objects of interest along a route, and (ii) classify each respective object of the detected objects of interest;

for a particular object of the detected objects of interest, determine that the safety threshold is not met;

in response to determining that the safety threshold is not met for the particular object, transmit, using a network communication interface, a first teleassistance inquiry to a backend computing system, the first teleassistance inquiry comprising LIDAR data generated by a LIDAR device of the SDV, wherein the set of sensors of the SDV includes sensors of the LIDAR device;

determine that a classification of one or more of the detected objects of interest does not satisfy a certainty threshold;

in response to determining that the classification of the one or more of the detected objects of interest does not satisfy the certainty threshold, transmit, using the network communication interface, a second teleassistance inquiry to the backend computing system, the second teleassistance inquiry comprising image data generated by one or more cameras of the SDV, the image data including the one or more detected objects of interest, wherein the set of sensors of the SDV includes sensors of the one or more cameras, and wherein the second teleassistance inquiry is different from the first teleassistance inquiry;

for each of the first and the second teleassistance inquiries, receive a resolution response from the backend computing system; and provide a control system of the SDV with data corresponding to the resolution response to enable the SDV to proceed in accordance with the resolution response.

13. The non-transitory computer readable medium of claim 12, wherein the safety threshold not being met corresponds to an obstruction in the live sensor view.

14. The non-transitory computer readable medium of claim 12, wherein the executed instructions cause the system to transmit LIDAR data and not image data when the safety threshold is not met.

15. The non-transitory computer readable medium of claim 12, wherein the executed instructions cause the system to transmit image data and not LIDAR data when the certainty threshold is not met.

16. The non-transitory computer readable medium of claim 12, wherein the executed instructions further cause the system to
monitor bandwidth of each of a plurality of wireless communication modules of the network communication interface to determine a highest bandwidth communication module;
wherein the executed instructions cause the system to transmit each of the first and the second teleassistance inquiries to the backend computing system using the highest bandwidth communication module.

17. The non-transitory computer readable medium of claim 16, wherein the executed instructions further cause the system to:
duplicate transmission of each of the first and the second teleassistance inquiries by transmitting the first and the second teleassistance inquiries over a second communication module from the plurality of wireless communication modules.

18. The non-transitory computer readable medium of claim 17, wherein the highest bandwidth communication module and the second communication module both comprise Long Term Evolution (LTE) communications modules.

19. A computer-implemented method performed by one or more processors and comprising:
analyzing a live sensor view generated by a set of sensors of a self-driving vehicle (SDV) in accordance with a safety threshold to (i) detect objects of interest along a route, and (ii) classify each respective object of the detected objects of interest;

for a particular object of the detected objects of interest, determining that the safety threshold is not met;

in response to determining that the safety threshold is not met for the particular object, transmitting, using a network communication interface, a first teleassistance inquiry to a backend computing system, the first teleassistance inquiry comprising LIDAR data generated by a LIDAR device of the SDV, wherein the set of sensors of the SDV includes sensors of the LIDAR device;

determining that a classification of one or more of the detected objects of interest does not satisfy a certainty threshold;

in response to determining that the classification of the one or more of the detected objects of interest does not satisfy the certainty threshold, transmitting, using the network communication interface, a second teleassistance inquiry to the backend computing system, the second teleassistance inquiry comprising image data generated by one or more cameras of the SDV, the image data including the one or more detected objects of interest, wherein the set of sensors of the SDV includes sensors of the one or more cameras, and wherein the second teleassistance inquiry is different from the first teleassistance inquiry;

for each of the first and the second teleassistance inquiries, receiving a resolution response from the backend computing system; and providing a control system of the SDV with data corresponding to the resolution response to enable the SDV to proceed in accordance with the resolution response.

* * * * *